US012258671B2

(12) United States Patent
Mariano et al.

(10) Patent No.: US 12,258,671 B2
(45) Date of Patent: Mar. 25, 2025

(54) REACTORS AND METHODS FOR PRODUCTION OF SUSTAINABLE CHEMICALS USING CARBON EMISSIONS OF METALLURGICAL FURNACES

(71) Applicant: Dioxycle, Bordeaux (FR)

(72) Inventors: Ruperto G Mariano, South San Francisco, CA (US); Sarah Lamaison, Paris (FR); Jonathan Maistrello, La Garenne Colombes (FR); David Wakerley, Paris (FR); Adnan Ozden, Paris (FR); Bastien Faure, Paris (FR); Lindsay Leveen, Sausalito, CA (US)

(73) Assignee: Dioxycle, Bordeaux (FR)

( * ) Notice: Subject to any disclaimer, the term of this patent is extended or adjusted under 35 U.S.C. 154(b) by 0 days.

(21) Appl. No.: 18/208,245

(22) Filed: Jun. 9, 2023

(65) Prior Publication Data

US 2024/0167170 A1 May 23, 2024

Related U.S. Application Data

(60) Provisional application No. 63/465,240, filed on May 9, 2023, provisional application No. 63/447,346, filed
(Continued)

(51) Int. Cl.
*C25B 3/09* (2021.01)
*B01D 7/00* (2006.01)
(Continued)

(52) U.S. Cl.
CPC .............. *C25B 3/09* (2021.01); *B01D 53/326* (2013.01); *B01D 53/62* (2013.01); *C01B 3/12* (2013.01);
(Continued)

(58) Field of Classification Search
None
See application file for complete search history.

(56) References Cited

U.S. PATENT DOCUMENTS 3,963,483 A 6/1976 Mathesius et al.
11,390,954 B2 7/2022 Spurgeon
(Continued)

FOREIGN PATENT DOCUMENTS

CA 3185397 A1 2/2022
CN 1049177 A 2/1991
(Continued)

OTHER PUBLICATIONS

Machine translation of Kato et al. WO 2011087036 A1 (Year: 2011).*
(Continued)

*Primary Examiner* — Wojciech Haske
(74) *Attorney, Agent, or Firm* — Daylight Law, P.C.

(57) ABSTRACT

Methods and systems for the valorization of carbon monoxide emissions from metallurgical furnaces into highly valuable low-carbon footprint chemicals using carbon monoxide electrolysis are disclosed herein are disclosed. A disclosed method includes operating a metallurgical furnace; obtaining, in connection with the operation of the metallurgical furnace, a volume of carbon monoxide; supplying the volume of carbon monoxide to a cathode area of a carbon monoxide electrolyzer to be used as a reduction substrate; and generating, using the carbon monoxide electrolyzer, the reduction substrate, and an oxidation substrate, a volume of generated chemicals. The volume of generated chemicals is at least one of: a volume of hydrocarbons, a volume of organic acids, a volume of alcohol, a volume of olefins and a volume of N-rich organic compounds.

11 Claims, 11 Drawing Sheets

Related U.S. Application Data on Feb. 21, 2023, provisional application No. 63/427,800, filed on Nov. 23, 2022.

(51) Int. Cl.

| | | |
|---|---|---|
| *B01D 53/32* | (2006.01) | |
| *B01D 53/62* | (2006.01) | |
| *C01B 3/12* | (2006.01) | |
| *C21B 7/00* | (2006.01) | |
| *C25B 3/25* | (2021.01) | |
| *F23J 15/02* | (2006.01) | |

(52) U.S. Cl.
CPC ............... *C21B 7/002* (2013.01); *C25B 3/25* (2021.01); *F23J 15/02* (2013.01); *B01D 2257/502* (2013.01); *B01D 2258/025* (2013.01); *C01B 2203/0283* (2013.01); *C21B 2100/80* (2017.05); *F23J 2215/40* (2013.01)

(56) References Cited

U.S. PATENT DOCUMENTS

| | | | |
|---|---|---|---|
| 11,591,226 | B1 | 2/2023 | Sunkara et al. |
| 2008/0283411 | A1 | 11/2008 | Eastman et al. |
| 2010/0280135 | A1 | 11/2010 | Doty |
| 2013/0118910 | A1 | 5/2013 | Teamey et al. |
| 2015/0136613 | A1 | 5/2015 | Li et al. |
| 2016/0318855 | A1* | 11/2016 | Meißner ............... C07C 273/10 |
| 2021/0123110 | A1 | 4/2021 | Krüger |
| 2021/0381116 | A1 | 12/2021 | Kashi et al. |
| 2022/0162726 | A1* | 5/2022 | Mennell ............... B01D 53/229 |
| 2022/0235426 | A1 | 7/2022 | Duarte |
| 2022/0305439 | A1* | 9/2022 | Nakama ................. C10K 3/026 |
| 2022/0372643 | A1 | 11/2022 | Wang et al. |
| 2022/0411943 | A1* | 12/2022 | Ghorai .................. C25B 11/054 |
| 2023/0111972 | A1 | 4/2023 | Echigo et al. |
| 2023/0175088 | A1 | 6/2023 | Cintron et al. |
| 2024/0082783 | A1 | 3/2024 | Villalon, Jr. et al. |

FOREIGN PATENT DOCUMENTS

| | | | |
|---|---|---|---|
| CN | 103130234 A | 6/2013 | |
| EP | 1861478 A1 | 12/2007 | |
| FR | 3121937 A1 | 10/2022 | |
| JP | 2000233905 A | 8/2000 | |
| JP | 6843490 B1 * | 3/2021 | ............. B01D 53/62 |
| WO | WO-2011087036 A1 * | 7/2011 | ........... B01D 53/326 |
| WO | 2020114899 A1 | 6/2020 | |
| WO | 2020237563 A1 | 12/2020 | |
| WO | WO-2021098980 A1 * | 5/2021 | ............... C01B 3/12 |
| WO | 2021197787 A1 | 10/2021 | |
| WO | 2022031726 A2 | 2/2022 | |
| WO | 2022148837 A2 | 7/2022 | |

OTHER PUBLICATIONS

Machine translation of Heinzel et al. WO 2021/098980 A1 (Year: 2021).*
Monterio et al. (Nature Communications | "2021" 12:4943). (Year: 2021).*
F. Yang et al., (2021). Harmonized comparison of virgin steel production using biomass with carbon capture and storage for negative emissions. International Journal of Greenhouse Gas Control.
FA Uribe et al., (1983). Electrochemistry in liquid ammonia: Part VI. Reduction of carbon monoxide. Journal of Electroanalytical Chemistry and Interfacial Electrochemistry, 152(1-2), 173-182.
M. Kirschen et al., (2011). Influence of direct reduced iron on the energy balance of the electric arc furnace in steel Industry. Fuel and Energy Abstracts.
Non-Final Office Action dated Jul. 27, 2023 from U.S. Appl. No. 18/138,116, 18 pages.
A. Alcasabas et al. "A Comparison of Different Approaches to the Conversion of Carbon Dioxide into Useful Products: Part I : CO2 reduction by electrocatalytic, thermocatalytic and biological routes." Johnson Matthey Technology Review 65 (2021): 180-196.
A. Ozden et al. (2021). Cascade CO2 electroreduction enables efficient carbonate-free production of ethylene. Joule, 5 (3), 706-719. https://doi.org/10.1016/j.joule.2021.01.007.
A. Prajapati et al.. (2022). CO2-free high-purity ethylene from electroreduction of CO2 with 4% solar-to-ethylene and 10% solar-to-carbon efficiencies. Cell Reports Physical Science.
J. Sisler et al. (2021). Ethylene Electrosynthesis: A Comparative Techno-economic Analysis of Alkaline vs Membrane Electrode Assembly vs CO2—CO—C2H4 Tandems. ACS energy letters, 6, 997-1002.
L. Berkelaar et al. (2022). Electrochemical conversion of carbon dioxide to ethylene: Plant design, evaluation and prospects for the future. Chemical engineering research and design (Transactions of the Institution of Chemical Engineers, part A), 182, 194-206. https://doi.org/10.1016/j.cherd.2022.03.034.
M. Jouny et al. (2018). High-rate electroreduction of carbon monoxide to multi-carbon products. United States. https://doi.org/10.1038/s41929-018-0133-2.
M. Jouny et al. (2019). Carbon monoxide electroreduction as an emerging platform for carbon utilization. Nature Catalysis, 2 (12). Retrieved from https://par.nsf.gov/biblio/10191695. https://doi.org/10.1038/s41929-019-0388-2.
M. Ramdin et al. (2021). Electroreduction of CO2/CO to C2 Products: Process Modeling, Downstream Separation, System Integration, and Economic Analysis. Industrial & engineering chemistry research, 60(49), 17862-17880. https://doi.org/10.1021/acs.iecr.1c03592.
M. Reinikainen et al. (2022). "Two-Step Conversion of CO2 to Light Olefins: Laboratory-Scale Demonstration and Scale-Up Considerations" ChemEngineering 6, No. 6: 96. https://doi.org/10.3390/chemengineering6060096.
Non-Final Office Action dated May 31, 2023 from U.S. Appl. No. 18/111,631, 14 pages.
O. Y. H. Elsernagawy et al. (2020). Thermo-economic analysis of reverse water-gas shift process with different temperatures for green methanol production as a hydrogen carrier. Journal of CO2 Utilization, 41, [101280]. https://doi.org/10.1016/j.jcou.2020.101280.
Waseda University. (2021, Jan. 13). Copper-indium oxide: A faster and cooler way to reduce our carbon footprint: Scientists set a record for the highest conversion rate of carbon dioxide at low temperatures with copper-modified indium oxide, signifying sustainable e-fuel. ScienceDaily. Retrieved May 31, 2023 from www.sciencedaily.com/releases/2021/01/210113100827.htm.
Y.A. Daza et al.. (2016). CO2 conversion by reverse water gas shift catalysis: comparison of catalysts, mechanisms and their consequences for CO2 conversion to liquid fuels. RSC Advances, 6, 49675-49691.
A. Mokhtari et al. (2022). Integrating Electric Arc Furnace and Biomass Gasification to Reduce Greenhouse Gas Emissions from Steel Making. SSRN Electronic Journal.
Final Office Action dated Oct. 26, 2023 from U.S. Appl. No. 18/138,116, 14 pages.
J. G .Bekker et al. (2000). Model predictive control of an electric arc furnace off-gas process. Control Engineering Practice, 8, 445-455.
Non-Final Office Action dated Feb. 1, 2024 from U.S. Appl. No. 18/138,116, 9 pages.
D.S. Ripatti et al. (2019). Carbon Monoxide Gas Diffusion Electrolysis that Produces Concentrated C2 Products with High Single-Pass Conversion. Joule.
International Search Report and Written Opinion from International Application No. PCT/IB2023/061762 dated Mar. 19, 2024, 8 pages.
International Search Report and Written Opinion from International Application No. PCT/IB2023/061814 dated Mar. 27, 2024, 10 pages.
S.T. Kim et al. (2011). Analysis of the heat of reaction and regeneration in alkanolamine-CO2 system. Korean Journal of Chemical Engineering, 28, 2275-2281.

(56) References Cited

OTHER PUBLICATIONS

T. Hay et al. (2021). A review of mathematical process models for the electric arc furnace process. steel research international, 92(3), 2000395.

K.D. Ras et al. (2019). Carbon capture and utilization in the steel industry: challenges and opportunities for chemical engineering. Current opinion in chemical engineering, 26, 81-87.

L. Yang et al. (2018). Present Situation and Prospect of EAF Gas Waste Heat Utilization Technology. High Temperature Materials and Processes, 37, 357-363.

M. Ozawa et al. (1986). Reduction of FeO in Molten Slags by Solid Carbon in the Electric Arc Furnace Operation. Isij International, 26, 621-628.

Non-Final Office Action dated Apr. 24, 2024 from U.S. Appl. No. 18/138,116, 32 pages.

Final Office Action dated Aug. 15, 2024 from U.S. Appl. No. 18/138,116, 49 pages.

International Search Report and Written Opinion from International Application No. PCT/IB2023/061759, dated May 15, 2024, 11 pages.

* cited by examiner

REACTORS AND METHODS FOR PRODUCTION OF SUSTAINABLE CHEMICALS USING CARBON EMISSIONS OF METALLURGICAL FURNACES

CROSS REFERENCE TO RELATED APPLICATIONS

This application claims the benefit of U.S. Provisional Application No. 63/465,240, filed on May 9, 2023, U.S. Provisional Application No. 63/447,346, filed on Feb. 21, 2023, and U.S. Provisional Application No. 63/427,800, filed Nov. 23, 2022, all of which are incorporated by reference herein in their entireties for all purposes.

BACKGROUND

There is an urgent need to develop technologies which make the capture or valorization of carbon dioxide ($CO_2$) more economical in highly emitting sectors such as metallurgy and chemical processes. Furthermore, there is an urgent need to reduce emissions related to the production of useful fuels and chemicals in our society and to find alternative ways to produce such fuels sustainably instead of relying on fossil resources for their production. Accordingly, technologies that both generate useful fuels and chemicals and at the same time use oxocarbon feedstocks that would otherwise have been emitted into the atmosphere, are critically important because they both generate useful chemicals without additional emissions and because the economic value of the useful chemicals can offset the cost of oxocarbon capture and conversion.

The production of iron and steel, collectively termed ferrous metals, are large-scale processes that produce large amounts of carbon emissions. These carbon emissions are difficult to abate because the production of ferrous metals from an oxide-bearing mineral ore requires the provision of a reducing agent, to reduce the oxide-bearing mineral ore into a material that has a higher proportion of reduced ferrous metals. At present, the reducing agent is commonly derived from a fossil fuel feedstock, such as but not limited to natural gas, coal, fossil-derived syngas, or petroleum. The use of these fossil fuel feedstocks incurs carbon emissions during the production of ferrous metal because the fossil fuel feedstock is converted to $CO_2$ or carbon monoxide (CO) when the furnaces are heated to the temperatures required to produce the ferrous metals.

SUMMARY

Methods and systems for the valorization of carbon monoxide emissions from metallurgical furnaces into highly valuable low-carbon footprint chemicals using carbon monoxide electrolysis are disclosed herein. The metallurgical furnaces discussed herein can be used for the generation or processing of metals. The metallurgical furnaces can be blast furnaces (BF), basic oxygen furnaces (BOF), direct reduced iron (DRI) furnaces, electric arc furnaces (EAF), and other metallurgical furnaces. The valorization of carbon monoxide as discussed herein refers to the transformation of the carbon components, the oxygen components, or the carbon and oxygen components of carbon monoxide into more economically valuable chemicals such as hydrocarbons, organic acids, alcohols, olefins and N-rich organic compounds. Using the approaches disclosed herein, such chemicals can be produced cost-competitively with conventional petrochemical routes and contribute to the development of a carbon circular economy.

The specific furnace types mentioned above have important technical distinctions, but common to all of them is the potential use of a carbon-containing feedstock that is transformed in the furnace into a reducing gas capable of reacting with oxidized materials or mineral ore to produce more reduced material or metallic product. The carbon-containing feedstock can come from different sources, such as but not limited to biomass, biochar, plastic, or fossil feedstock. The resulting off-gas from the furnace can then result in direct carbon oxide emissions. In some embodiments of the DRI furnace process, a reducing agent that does not produce direct carbon oxide emissions such as dihydrogen ($H_2$) or ammonia ($NH_3$) can be used as the feedstock gas to produce metal. However, even in these approaches the generation of those reducing agents is often carried out using a process that itself produces direct carbon oxide emissions. The production of direct carbon oxide emissions motivates the invention of a method and/or system that can capture and convert the direct carbon oxide emissions to lower the climate warming impact of the different furnace processes. As used herein, the term off-gas can refer to effluent from a metallurgical furnace that would otherwise be flared or sequestered instead of being utilized to extract carbon monoxide or other useful gases as described herein. Metallurgical furnaces often operate in combination with recirculation systems, such as those that circulate unreacted reduction gases back into a metallurgical furnace. These recirculation systems include the ability to generate a purge gas that is removed from recirculation to prevent the build up of chemicals that are not consumed or are damaging to the systems in which the gas recirculates. Accordingly, the term off-gas as used herein can refer to purge gases from a recirculation system in a metallurgical furnace that would otherwise be flared or sequestered instead of being utilized to extract carbon monoxide or other useful gases as described herein.

The BOF process converts carbon-containing iron or scrap steel, also called the furnace charge, into higher-quality steel. In a typical BOF process, oxygen is injected at high pressure and velocity into a high-temperature furnace using fluid-cooled lances that penetrate the heated metal within the BOF. The oxygen is injected in the form of dioxygen gas ($O_2$). The $O_2$ reacts with the carbon contained within the furnace charge to form CO and increases the temperature of furnace because the combustion of carbon with $O_2$ is a highly exothermic process. Additional lances can be provisioned to increase the degree of CO combustion. In a typical BOF process, the outlet gas composition has a high proportion of CO. The increase in temperature melts the metallic charge and lowers the carbon content of the metal. Unwanted elements in the furnace charge also react with $O_2$ to form oxides. The use of oxygen in the form of $O_2$ instead of air is important because it reduces the degree of undesired reactions between non-$O_2$ components in air (such as but not limited to $N_2$) with the furnace charge. Prior to injection to a BOF, $O_2$ must be purified from air using a separation/purification process prior to entry into the BOF increasing costs of operating the BOF process. Indeed, ASU (Air Separation Units), usually based on cryogenic processes, consume between 180 and 450 kWh per ton of $O_2$.

Using specific embodiments of the inventions disclosed herein, the high CO content of the off-gas of a BOF can be utilized in that the CO content of the off-gas can be enriched by a separator and the resulting CO-rich stream can be supplied to a CO electrolyzer to be valorized. Additionally, using specific embodiments of the inventions disclosed herein, purified oxygen can be harvested from alternative points of the overall system in which the BOF is operating, such as from the CO electrolyzer, which can reduce the costs of operating the BOF.

In a DRI process, iron-containing ore or minerals are subjected to a heated furnace fed with a reducing gas. The reducing gas can contain but is not limited to hydrogen ($H_2$), $NH_3$, CO, methane ($CH_4$), $CO_2$, water and/or combinations thereof. The reducing gas reacts with the oxidized iron ore to form so-called direct reduced iron. In specific approaches, the reducing gas can be sourced from the conversion, reforming, and/or gasification of fossil fuel feedstocks such as gas, naphtha, coal, plastic, biomass, biochar, and/or other hydrocarbon feedstocks. As the reducing gas reacts with the oxidized iron ore, $CO_2$ and $H_2O$ are generated along with reduced iron species. $O_2$ is provided to the DRI process to provision process heat by inducing partial combustion of the reducing gas. The DRI process can be operated continuously such that the reduced iron product is continually moved out of the reactor, along with an excess of unreacted reducing gas. In a typical DRI process, the outlet gas composition has a high proportion of CO. This CO can be unreacted CO (in situations where CO or syngas were fed to the DRI) or from the partial oxidation of the reducing feedstock that is fed to the DRI.

In specific embodiments of the inventions disclosed herein, the CO from the outlet gas of a DRI furnace can be provided to a carbon monoxide electrolyzer to produce useful chemicals. In the alternative or in combination, any CO from the production of the reducing gas for the DRI furnace can be provided to the CO electrolyzer to produce useful chemicals.

In specific embodiments of the inventions disclosed herein, the CO from an off-gas in the form of a purge gas from a metallurgical furnace can be provided to a carbon monoxide electrolyzer to produce useful chemicals. The purge gas may be a gas in which CO is recycled back to a metallurgical furnace either alone or in combination with other non-fully reacted feedstocks, and the purge may exist to subtract part of this stream from the recirculation loop in order to avoid accumulation of some species.

In a BF process, metal-containing ore or minerals are subjected to a heated furnace fed with a carbonaceous feedstock, air and/or oxygen. Typically, coal, coke, or coal and coke are used as the reducing agent in the BF process. During operation, part of the reducing agent is combusted and/or converted producing heat, CO, and $CO_2$. During operation, the CO produced from the conversion of coal reacts with metal oxides within the BF, resulting in reduced metallic species and the generation of $CO_2$. Less reducible species containing Ca and/or Si, such as but not limited to $CaCO_3$ and $SiO_2$ are further converted during operation to CaO and $CaSiO_3$ respectively, producing $CO_2$ in the process. Because not all the coke or coal fed into the BF process is converted, the resulting reduced metallic product contains a substantial proportion of carbon. The $CO_2$ produced throughout the BF process can also further react with the coke in the BF to produce CO. In a typical BF process, the outlet gas composition has a high proportion of CO.

In specific embodiments of the inventions disclosed herein, the CO from the off-gas of a BF can be provided to a carbon monoxide electrolyzer to produce useful chemicals.

Argon oxygen decarburization (AOD) removes carbon from a metallic charge in a metallurgical furnace and transforms it into a purified metallic product and CO. The AOD process is accomplished by injecting oxygen mixed with argon, an inert and unreactive gas, into a high-temperature furnace to oxidize the carbon contained within the metallic charge to CO while minimizing oxidation of valuable metallic charge such as but not limited to chromium and aluminum. Operators of an AOD process typically provide high-purity oxygen into the AOD process to minimize the degree of undesired reaction between the metallic charge and undesired gases, such as dinitrogen, to form chromium and aluminum nitrides. The requirement of high purity dioxygen along with the injection of argon imposes a cost on AOD operators because it is costly to separate dioxygen and argon from air. In a typical AOD process, the outlet gas composition has a high proportion of CO. In specific embodiments of the inventions disclosed herein, a metallurgical furnace can be used in combination with an AOD process, the resulting carbon monoxide rich stream can be provided to a carbon monoxide electrolyzer, and pure oxygen generated by the electrolyzer can be fed back to the AOD process.

In specific embodiments of the inventions disclosed herein, the CO from the outlet gas of a metallurgical furnace during an AOD treatment can be provided to a carbon monoxide electrolyzer to produce useful chemicals. In the alternative or in combination, using specific embodiments of the inventions disclosed herein, purified oxygen can be harvested from alternative points of the overall system in which the metallurgical furnace is operating which can reduce the costs of operating the AOD process.

The production of metals using some of the processes described above is accompanied by the generation of a slag. The formation of the slag can also produce carbon monoxide. The slag exhibits a lower density compared to the metallic products. Therefore, the slag floats on the top of the melting metals and advantageously provides some thermal insulation of the molten product to reduce heat losses while protecting the furnace roof and walls from the radiant heat of the reactor. This foaming slag is usually generated by the reaction of oxygen injected into the molten metal bath with contaminants and added carbon, such as coal or coke that are supplemented to transform any metal oxide to metallic product, leading to the co-generation of CO.

In specific embodiments of the inventions disclosed herein, purified oxygen can be harvested from alternative points of the overall system in which a metallurgical furnace is operating and can be recirculated to the metallurgical furnace to form the slag mentioned in the prior paragraph thereby reducing the cost of operating the metallurgical furnace.

High-temperature furnace technologies described above lead to the generation of a large amount of CO in the off-gas alongside with the main gas components such as hydrogen, methane, nitrogen and water, gas impurities such as $CO_2$, phosphine ($PH_3$), sulfur oxides ($SO_x$) and nitrogen oxides ($NO_x$), and solid contaminants such as dust, ashes and particulate matter (PM). Due to their composition, such furnace off-gases are highly explosive, and their handling incurs significant costs. To dispose of furnace off-gases, particulates are removed from the gas stream prior to flaring or combusting the gas stream to produce, notably, $CO_2$ vented into the atmosphere. The recent increase in fossil resource costs and deployment of regulations to prevent environmental damages and health hazards associated with such venting have led to the development of solutions to capture and utilize the off-gases for the heat content associated with any CO present in the off-gas.

Effectively valorizing the furnace process off-gas as heat is challenging because of the low calorific value of CO.

Because the net heating value of CO is 12,035 kJ/Nm³ (compared to that of methane, 35,851 kJ/Nm³ of methane), the use of CO for heating purposes is sub-optimal in the context of reducing greenhouse gas emissions. The combustion of one molecule of CO produces one molecule of $CO_2$. The combustion of one molecule of methane also produces one molecule of $CO_2$. However, the heat generated by the combustion of one mole of CO will be around three-fold lower than the heat generated by the combustion of one mole of methane. Furthermore, for the same amount of heat generated by burning CO or methane, the combustion volume chamber and the amount of generated flue gas will be much larger in the case of CO combustion, thus leading to higher investment costs. As regulations increasingly penalize $CO_2$ emissions, such inefficiency will lead to increased operating costs and reduced profitability hence limiting the viability of high-temperature carbon-fed furnace processes.

In a standard blast furnace, coal and/or coke is used to generate the CO required to reduce the iron ore to iron. However, it also plays a role in the mechanical stability of the furnace content so that it cannot be fully replaced by gaseous reductants (e.g., an approach wherein the furnace is powered entirely by green dihydrogen). Certain avenues envisioned to reduce the carbon footprint of existing BF include using reducing gases such as low-carbon-footprint CO or $H_2$. However, only up to 30% of the equivalent coal/coke load can be replaced by such reducing gases because the coke and coal charge is required to ensure the mechanical stability of the furnace charge. Moreover, the provision of dihydrogen into a furnace containing only an iron-containing ore would lead to the consumption of dihydrogen to reduce components besides iron-containing ore into a metallic product, producing an impure product stream at the outlet of the metallurgical furnace. The necessity of including coke and/or coal as a charge within the furnace to ensure mechanical stability motivates a method to lower the direct CO and $CO_2$ emissions of metallurgical furnaces that use coke and/or coal.

The combination of a metallurgical furnace process with a CO electrolysis process can improve the process economics of both systems. The combination provides a route to reduce the cost of oxygen provisioning for the metallurgical furnace process, valorizes the dioxygen product generated by the CO electrolyzer, reduces the carbon emissions of the metallurgical furnace process, and provides a lower-cost CO feedstock source for the CO electrolysis process.

The production of oxygen for the metal-producing furnace processes detailed above incurs a cost for process operators which is minimized when the oxygen is sourced and recirculated from the system. To provision dioxygen into the high-temperature furnaces, process operators typically purify dioxygen from air using a few means, such as but not limited to cryogenic separation, pressure swing adsorption and/or vacuum pressure swing adsorption. These separation processes necessitate the installation of air processing and separation units in conjunction with the furnace technologies, and are costly to operate because of the electricity, heat, and maintenance required for these separation technologies. In contrast, CO electrolyzers can produce one mol of dioxygen for every four moles of electrons transferred in the device, regardless of the cathode outlet composition. The dioxygen produced by CO electrolyzers represents an opportunity to improve the margin of the CO electrolysis process if the dioxygen can be valorized by another process.

The use of pure oxygen from a CO electrolyzer within a metallurgical furnace instead of air provides a route for the users of a metallurgical furnace to reduce the cost of $O_2$ production. Furthermore, the use of electrolyzer-derived dioxygen instead of air (containing dinitrogen) has a further non-obvious benefit of increasing the CO concentration within the gas stream departing the metallurgical furnace, which improves the efficiency of the CO purification process downstream as dinitrogen no longer dilutes the gas stream.

Integrating a CO electrolyzer downstream of a metallurgical furnace process provides a novel cost-effective mechanism for the operators of a metallurgical furnace to reduce their carbon emissions and mitigate regulatory risk. For example, the chemistry of carbothermal processes such as but not limited to coal-fueled iron production from iron ore in a BF imposes a minimum iron to $CO_2$ molar ratio of 4:3, via equation 1 below. In practice the ratio of iron to $CO_2$ is typically lower because a substantial proportion of the coal fed into the furnace is combusted for heat instead of being used as a reductant. Other materials such as but not limited to phosphorus, titanium, magnesium and silicon are also produced using carbothermal processes that stoichiometrically consume coke or coal to yield a reduced element and CO or $CO_2$. In another example, natural gas or methane can be processed using steam reforming or partial oxidation to produce syngas (i.e., a mixture of CO and hydrogen in varying proportions). This reducing gas can be used to reduce oxidized metal ores into their reduced metallic forms, as in the case of the production of sponge iron via DRI or in the production of manganese. Despite its many critical uses, at present there are few viable alternatives to produce iron cost-effectively and at large scales without using fossil fuels or fossil carbon as a feedstock. Because fossil carbon fueled processes stoichiometrically produce CO or $CO_2$, the operator of such a process must then capture and sequester these direct carbon emissions for the process to be compliant with net-zero carbon emissions standards or regulations. Additional indirect emissions arise from the necessity of providing heat and electricity to the process, typically from burning fossil fuels.

$$2Fe_2O_3 + 3C \rightarrow 4Fe + 3CO_2 \qquad \text{Eq (1)}$$

Most methods used by metal-producing furnace operators to clean-up the furnace off-gas are oxidative in nature and unsuitable for integration with CO electrolysis. After de-dusting, operators of metal-producing furnaces typically clean up the furnace-off-gas by flaring or combusting the mixture with air to produce a mixture of gases such as $N_2$, SOx, NOx, $P_2O_5$, $H_2O$, HCl, and $CO_2$. However, an oxidative process such as flaring or combusting releases the energy embedded in CO to produce $CO_2$, squandering an opportunity to use the CO to produce value-added chemicals. Furthermore, this off-gas includes acid equivalents present in the gas stream which would be damaging to a CO electrolyzer and increase the cost of operation.

In specific embodiments of the inventions disclosed herein, a separator that uses a non-oxidative separation process is used to separate out the acid equivalents from the off-gas of a metallurgical furnace in order to form a CO-rich stream which can be supplied to a CO electrolyzer to valorize the CO. The CO-rich stream can include less than 5% of $CO_2$ by volume and be compatible with long-term reliable use of a CO electrolyzer. Supplying the off-gas of a metallurgical furnace to a CO electrolyzer has not been obvious because of the acid content of the off-gas which would damage the CO electrolyzer. Furthermore, processing the off-gas with a separator to form a CO-rich stream for a CO electrolyzer has not been obvious because traditional routes to valorize CO (e.g., methanol synthesis, the Sabatier reaction to produce methane, water gas shift to produce dihydrogen, and the Fischer Tropsch process to produce liquid hydrocarbons from carbon monoxide and hydrogen) and such traditional processes are relatively insensitive to the presence of acid in the off gas.

In specific embodiments of the inventions disclosed herein, a method is provided. The method includes: operating a metallurgical furnace; obtaining, in connection with the operation of the metallurgical furnace, a volume of carbon monoxide; supplying the volume of carbon monoxide to a cathode area of a carbon monoxide electrolyzer to be used as a reduction substrate; and generating, using the carbon monoxide electrolyzer, the reduction substrate, and an oxidation substrate, a volume of generated chemicals; wherein the volume of generated chemicals is at least one of: a volume of hydrocarbons, a volume of organic acids, a volume of alcohol, a volume of olefins and a volume of N-rich organic compounds.

In specific embodiment of the inventions disclosed herein, a system is provided. The system includes: a metallurgical furnace; an off-gas port of the metallurgic furnace for an off gas including a volume of carbon monoxide; a carbon monoxide electrolyzer having an anode area and a cathode area; and at least one fluid connection; wherein the volume of carbon monoxide is routed from the off-gas port to the cathode area using the at least one fluid connection.

In specific embodiment of the inventions disclosed herein, a method is provided. The method includes: operating a metallurgical furnace; obtaining, in connection with the operation of the metallurgical furnace, an off-gas stream from the metallurgical furnace; separating, using a separator, the volume of carbon monoxide from the off-gas stream from the metallurgical furnace, wherein the separating produces a carbon monoxide rich stream and the carbon monoxide rich stream is less than 5% carbon dioxide by volume; supplying the carbon monoxide rich stream to a cathode area of a carbon monoxide electrolyzer; and generating, using the carbon monoxide electrolyzer, the volume of carbon monoxide as a reduction substrate, and an oxidation substrate, a volume of generated chemicals.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
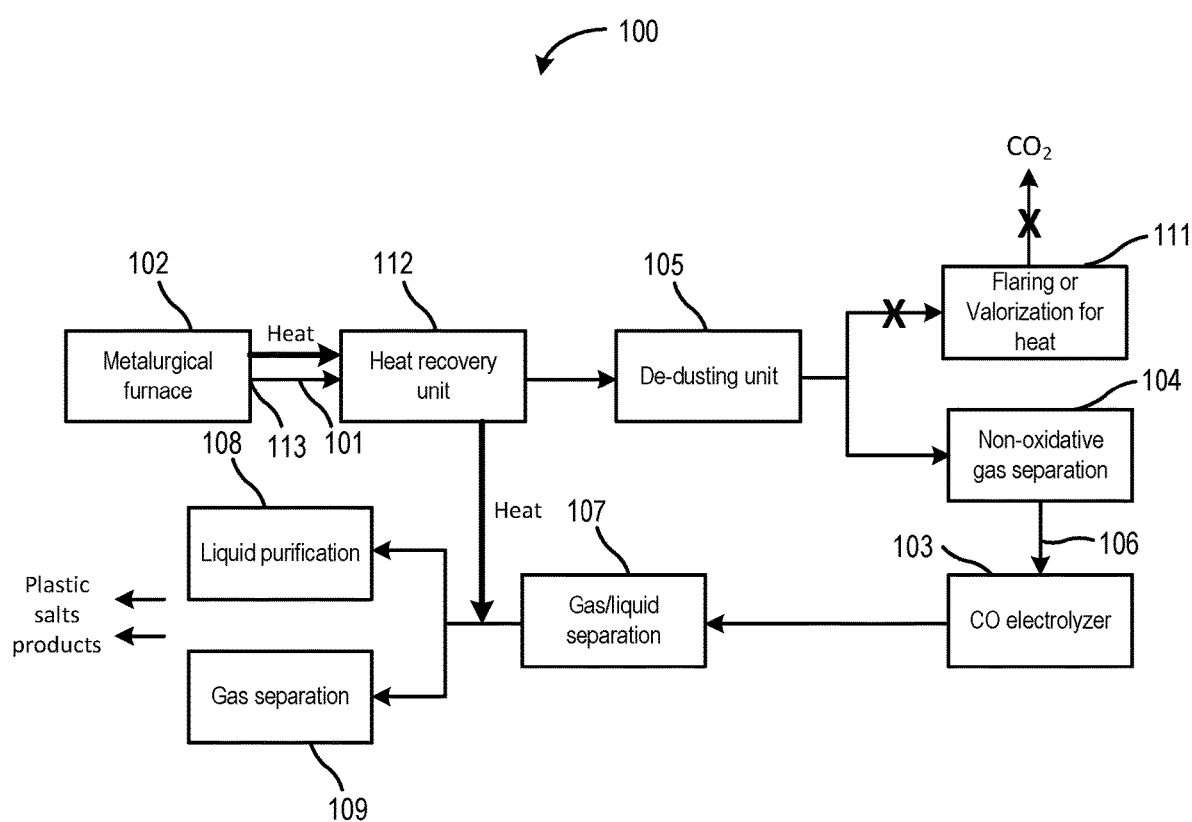
FIG. 1 illustrates a system for valorizing a volume of CO of an off-gas stream from a metallurgical furnace using a CO electrolyzer in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Methods and systems for the valorization of CO emissions from metallurgical furnaces into highly valuable low-carbon footprint chemicals using CO electrolysis in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

In specific embodiments of the inventions disclosed herein, the off-gas from a metallurgical furnace (e.g., a purge gas or a gas that would otherwise have been flared or combusted for heat) is not vented or used for heat or power generation but is instead processed using a gas separation system to obtain a CO-rich stream. In such cases, a separation unit is fluidly connected to the furnace and is fed with a volume of off-gas and produces a volume of CO with the desired purity. The volume of CO can then be provided to the cathode of a novel reactor, a CO electrolyzer, where it can be used as the reduction substrate for a reduction reaction paired with an oxidation reaction at the anode of the CO electrolyzer. The reduction of the volume of CO can valorize the CO to produce useful chemicals that would otherwise have been produced via carbon-intensive petrochemical processing. One or more additive chemicals can be provided with the volume of CO to the electrolyzer to thereby result in the production of different value-added chemicals. The characteristics of the produced chemicals depend on the characteristics of the electrolyzer and the additive chemicals.

The source of the CO rich stream can take on different forms in the various specific embodiments of the inventions disclosed herein. For example, the CO rich stream can be derived from a carbonaceous output from a process used to produce a reducing gas for a metallurgical furnace, or it can be an off-gas from the metallurgical furnace. In either case, the CO-rich stream and its accompanying volume of CO can be described as being obtained in connection with the operation of the metallurgical furnace because the volume of carbon monoxide is produced when creating a feedstock for operation of the CO electrolyzer or from operation of the CO electrolyzer. In specific embodiments of the inventions disclosed herein, the off-gas from which CO is recovered is from a DRI furnace that uses methane, natural gas, or other carbonaceous input as a feedstock. The CO produced by the DRI furnace is used as a feedstock for the CO electrolyzer to produce valuable products. In specific embodiments of the invention, the purge gas from which CO is recovered is obtained from a BF, BOF, or EAF. The CO produced by the BF, BOF, DRI or EAF is used as a feedstock for the CO electrolyzer to produce valuable products.

The separators used in specific embodiments disclosed herein can be single unit systems or more complex systems including multiple phases such as de-dusting units and various separators directed to separating out different chemicals from the off-gas. The separators can include non-oxidative gas separators, acid scrubbers, oxygen separators, dihydrogen separators, and various other separators. In specific embodiments of the inventions disclosed herein the separators will not screen certain chemicals from the off-gas during the formation of the CO rich stream because the chemicals are not damaging to a CO electrolyzer. For example, in specific embodiments, the separator will not remove dihydrogen from the off-gas because it can be provided to a CO electrolyzer without causing any problems. This frees up the design of the separator to focus on other factors such as efficiency or increased purity with respect to alternative chemicals that would damage the electrolyzer.

In specific embodiments of the invention, a non-oxidative separation technology, such as but not limited to absorption, adsorption, reactive separation, or membrane separation, can be employed to recover the CO from a metallurgical furnace and produce a CO-rich stream from the off-gas of the metallurgical furnace. In non-oxidative separation technologies, care is taken to minimize the oxidation of reduced compounds in the gas mixture, such as CO and dihydrogen. A non-oxidative separation technology can thereby preserve the CO content of the off-gas for valorization.

In specific embodiments of the invention, a separator can include an acid scrubber. To condition the CO for provision into a CO electrolyzer, undesired and reducible gas components such as dioxygen and $CO_2$ can be separated from the gas mixture, depending on desired process conditions. For example, the separator can include an acid scrubber to remove $CO_2$ from the CO-rich stream. In specific embodiments, the CO-rich stream can include less than 5% (including less than 3% and less than 2%) of $CO_2$ by volume which will result in efficient and reliable long-term usage of a CO electrolyzer with an alkaline electrolyte as described below. In specific embodiments, the CO rich stream can include less than 30% (including less than 20% and less than 10%) of $CO_2$ by volume.

The energy required to power the electrochemical processes occurring at the cathode and anode of a CO electrolyzer is minimized when a CO electrolyzer is operated with highly alkaline electrolyte, notably at the anode. Operating at high pH also enables the use of efficient, abundant metallic catalysts for the water oxidation reaction at the anode of the CO electrolyzer. However, at steady state, the $CO_2$ upstream of the CO electrolyzer reacts with alkaline equivalents in the electrolyzer (see eq. 2-5 below), consuming alkaline equivalents in the electrolyzer and lowering the operating pH of the electrolyzer because bicarbonate and carbonate species are formed. This leads to large increases in the energy required to power the electrolysis process, and the formation of these anionic species and their salts leads to declines in electrolyzer performance and operational stability.

$$CO_2 + OH^- \rightleftharpoons HCO_3^- \quad (2)$$

$$CO_2 + H_2O \rightleftharpoons H_2CO_3 \quad (3)$$

$$HCO_3^- + OH^- \rightleftharpoons CO_3^{2-} + H_2O \quad (4)$$

$$HCO_3^- + H_2O \rightleftharpoons H_3O^+ + CO_3^{2-} \quad (5)$$

A lower electrolyzer pH leads to higher energy requirements at the anode of a CO electrolyzer because non-precious anode materials such as but not limited to Ni, Co, Mn, Ti and even those made of precious materials such as Ir, Ru, Pt and Fe or their alloys with high activity, selectivity, and stability require higher driving forces to achieve the same current at low pH versus high pH. The cathode overpotential is also lower at high electrolyzer pH because the thermodynamic potential for CO reduction becomes more negative as pH rises. A lower electrolyte pH can also increase the proportion of current that produces dihydrogen at the cathode instead of reducing CO to more valuable products and alter the product distribution of the CO reduction products.

Reaction of $CO_2$ with the alkaline electrolyte can also lead to corrosion and degradation of the components of a CO electrolyzer. For example, the lower electrolyzer pH mentioned above can negatively impact the performance/stability of electrolyzer membranes by reducing rates of transport of lifetimes. As another example, the reaction of $CO_2$ to produce carbonate and bicarbonate species can also lead to the formation of salt precipitates or regions of high salt concentration that foul electrolyzer components (such as catalyst layer and gas diffusion layer) and lead to substantially degraded performance. For the cathode section, these precipitates are generally hygroscopic and impede efficient gas and liquid transport across the cathode. As another example, salts formed from the reaction of alkaline media with $CO_2$ can also precipitate within the membrane pores and impede efficient ion transport, resulting in a higher ohmic loss and eventually poorer electrolyzer efficiency and stability. At the anode, the incorporation of anionic species besides hydroxide can reduce the efficiency and stability of the anodic oxidation reaction because of site poisoning and increased rates of catalyst/substrate corrosion.

In addition, the presence of reducible gases such as but not limited to NOx, SOx, $CO_2$ and $O_2$ in the gas mixture divert electrons away from the CO reduction process, leading to lower energy efficiency. It is therefore desirable to feed the CO electrolyzer with as high a partial pressure of CO as possible or at least as high a volume ratio of CO over reducible gases as possible. For these collective reasons, it is important to remove $O_2$ and $CO_2$ from the CO-containing stream prior to provision into the CO electrolyzer. It is important to note that the CO electrolyzer can however perform well even when the CO is diluted with a non-reducible gas.

FIG. 1 illustrates a system 100 for valorizing a volume of CO of an off-gas stream 101 from a metallurgical furnace 102 using a CO electrolyzer 103 with a non-oxidative gas separation unit 104 used to treat the off-gas before it is provided to a CO electrolyzer. The lines linking the boxes in FIGS. 1-7 and 10 represent fluid connections between the blocks unless they are labeled "heat" which indicates that they are connections for transmitting heat from one block to another. The individual lines can also represent portions of fluid connections such as the fluid connection from metallurgical furnace 102 to CO electrolyzer 103 in FIG. 1. The off-gas can be obtained from an off-gas port 113 of the metallurgical furnace 102. As illustrated, the system includes a de-dusting unit 105 downstream of a heat recovery unit and upstream of the non-oxidative gas separation unit 104. In this example, the non-oxidative gas separation unit 104 produces a CO-rich stream 106 with less than 5% $CO_2$ by volume. For example, after leaving the de-dusting unit 105 the treated furnace off-gas can be treated by a separator with a pressure swing adsorption system and removal of acid-gas via absorption. The CO-rich stream 106 can then be supplied to the CO electrolyzer. The resulting stream can then be sent to a gas/liquid separation unit 107 to split the stream into liquid and gaseous products. The liquid products can then be treated by a liquid purification unit 108 and the gaseous products can then be treated by a gas separation unit 109. The output of this system are plastic precursors, fuel precursors, salts, and other valuable chemical products. FIG. 1 includes an unused unit 111 for flaring or heat valorization via the combustion of CO to illustrate the fact that in system 100 the CO is not used in a manner which leads to the direct emission of $CO_2$. The fact that the unit is not used is illustrated by the "X" marks covering the path to the unit and the $CO_2$ emission stream.

In specific embodiments of the invention, the off-gas of the metal-producing furnace contains an appreciable amount of dihydrogen, which can be separated and/or purified and valorized in a separate part of the process chain. As a non-limiting example, the dihydrogen can be supplied to a furnace unit such as a DRI unit powered by dihydrogen, supplied to a BF as partial replacement of the carbonaceous load supplied into a reverse water gas shift (RWGS) reactor to react with $CO_2$ to produce CO for use in the CO electrolyzer, or be fed into the anode of the CO electrolyzer to be used as the oxidation substrate.

The heat contained within the furnace off-gas can be problematic in that it is higher temperature than what is required for appropriate operation of a CO electrolyzer. For the CO electrolyzer to function effectively, feedstock gases are generally provisioned in the range of 0 to 100° C. Traditional ways to cool off-gases include mixing the off-gas with air. The off-gas can also be cooled by bubbling separated CO from the off-gas through a humidifier filled with cold water after the separator separates out the CO. This mixing cools the off-gas and oxidizes the CO within the off-gas into $CO_2$. However, these processes lead to the conversion of CO in the off-gas to $CO_2$ and a concomitant decrease in the performance of a system designed to valorize the CO in the manner disclosed herein. Accordingly, in specific embodiments of the inventions disclosed herein, the off-gas can be cooled using a non-oxidative cooling process. In specific embodiments of the inventions disclosed herein, the heat is advantageously recovered using a non-oxidative heat exchange and/or heat storage system. Prior approaches have not utilized a nonoxidative cooling process for a furnace off-gas because existing methods to valorize the furnace off-gas are relatively insensitive to high temperatures (such as but not limited to flaring) or to the presence of $CO_2$ (such as but not limited to Fischer-Tropsch and methanol synthesis).

Examples of non-oxidative systems for cooling the off gas that can be used in specific embodiments of the inventions disclosed herein include but are not limited to a series of heat exchangers, thermal masses, and/or thermal batteries. The cooling can be conducted by contacting the off-gas with a thermal storage system such as a thermal battery or brick stack. As another example, the gases can be cooled by increasing the length of the tubing, piping, or other conduit used to transport the off-gas.

In specific embodiments of the inventions disclosed herein, the heat from the off-gas can be valorized at other points of the system such as in a separator. The harvested heat can be advantageously used in an element of the overall process chain, such as gas separation or liquid production distillation, to reduce heat input into the overall process, or be valorized in a different manner, such as but not limited to being use as municipal or industrial heat or to generate electricity. FIG. 1 provides an example of heat recovery unit 112 harvesting the heat from the off-gas and supplying it to assist in the gas/liquid separation of gas/liquid separation unit 107. To be suitable for valorization within the process chain, the furnace off-gas can be sufficiently cooled as to be compatible with the next, immediate component of the process chain, which may include but is not limited to a gas separation unit to purify the CO, a dedusting unit, or the CO electrolyzer itself. In the case of integration with the separation unit as in FIG. 1, the furnace off-gas can be cooled to a temperature range of 25 to 350° C., depending on the technology used, which includes temperatures within the range of 0 to 100° C. mentioned previously as temperatures conducive to the operation of a CO electrolyzer.

Figure 2:
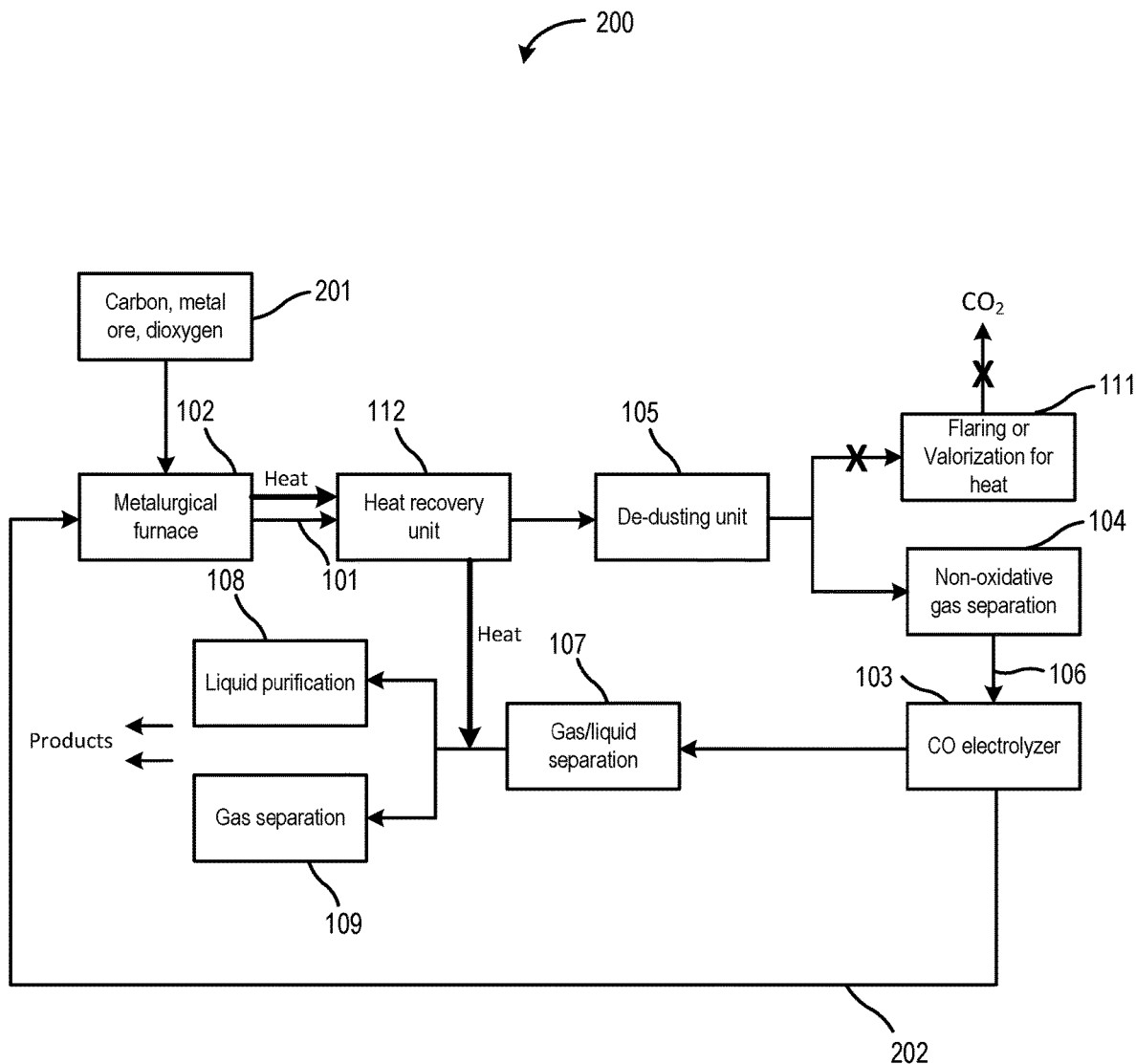
FIG. 2 illustrates a system for valorizing a volume of CO of an off-gas stream from a metallurgical furnace using a CO electrolyzer where dioxygen produced by the CO electrolyzer is circulated to the metallurgical furnace in accordance with specific embodiments of the inventions disclosed herein.
Figure 3:
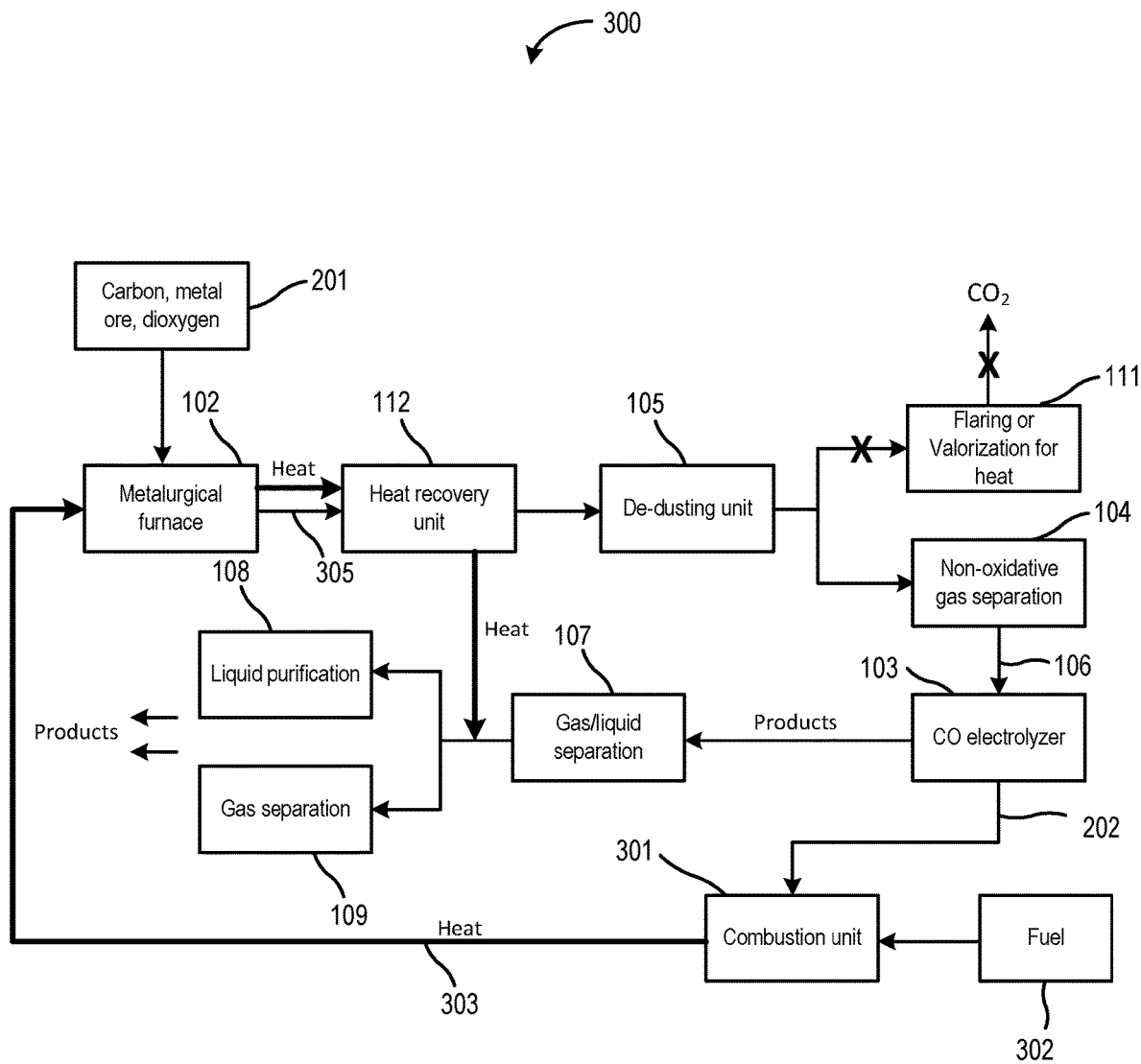
FIG. 3 illustrates a system for valorizing a volume of CO of an off-gas stream from metallurgical furnace using a CO electrolyzer where dioxygen produced by the CO electrolyzer is used to combust a fuel to produce heat for the metallurgical furnace in accordance with specific embodiments of the inventions disclosed herein.

In specific embodiments of the invention, $O_2$ is provisioned from a CO electrolyzer and into a metallurgical furnace to improve the process economics and/or efficiency for both the electrolyzer and the furnace processes. The anode area of a CO electrolyzer can produce $O_2$ from the oxidation of water and/or hydroxide and be fluidly connected to the $O_2$ intake for the metallurgical furnace or a subsystem of the metallurgical furnace process chain. Prior to being provisioned into the metallurgical furnace, a conditioning system can condition the gas stream including the $O_2$. The conditioning system can include subsystems such as but not limited to compressors, dehumidifiers, and metering systems to control the characteristics of the $O_2$ feed. The controllable characteristics can include pressure, humidity, temperature, flow rate, and other characteristics. FIG. 2 illustrates a system 200 with similar elements to system 100 in which a volume of oxygen 202 in the form of purified $O_2$ is fed back to an oxygen port of a metallurgical furnace 102 where it is used along with an input of carbon and metal ore 201. The volume of oxygen 202 can be used by the furnace in various ways such as serving as a fuel source for an oxy-fuel burner or other combustion system used to heat the furnace, generating the reducing gas for the furnace, or by serving as a fuel source for the generation of a feedstock to the metallurgical furnace. FIG. 3 illustrates a system 300 with similar elements to system 100 in which a volume of oxygen 202 in the form of purified $O_2$ is fed back to a combustion unit 301 where it is used in combination with a fuel source 302 to produce heat 303 to increase the temperature of metallurgical furnace 102. The heat improves the efficiency of the reaction in metallurgical furnace 102. Off-gas stream 305 can be similar to off-gas stream 101.

In specific embodiments of the invention, the $O_2$ from the CO electrolyzer is provisioned to the metallurgical furnace burners to improve the efficiency of a combustion process to generate heat. Metallurgical furnace systems can have combustion subsystems to heat the process gas. In such cases, the feedstock to the combustion system is a combustible material such as but not limited to methane, natural gas, coal, naphtha, or hydrogen and air or dioxygen (e.g., fuel source 302 in FIG. 3). It can be preferable to a process operator to enforce a higher dioxygen feed rate into the combustion chamber to improve process efficiency.

Figure 4:
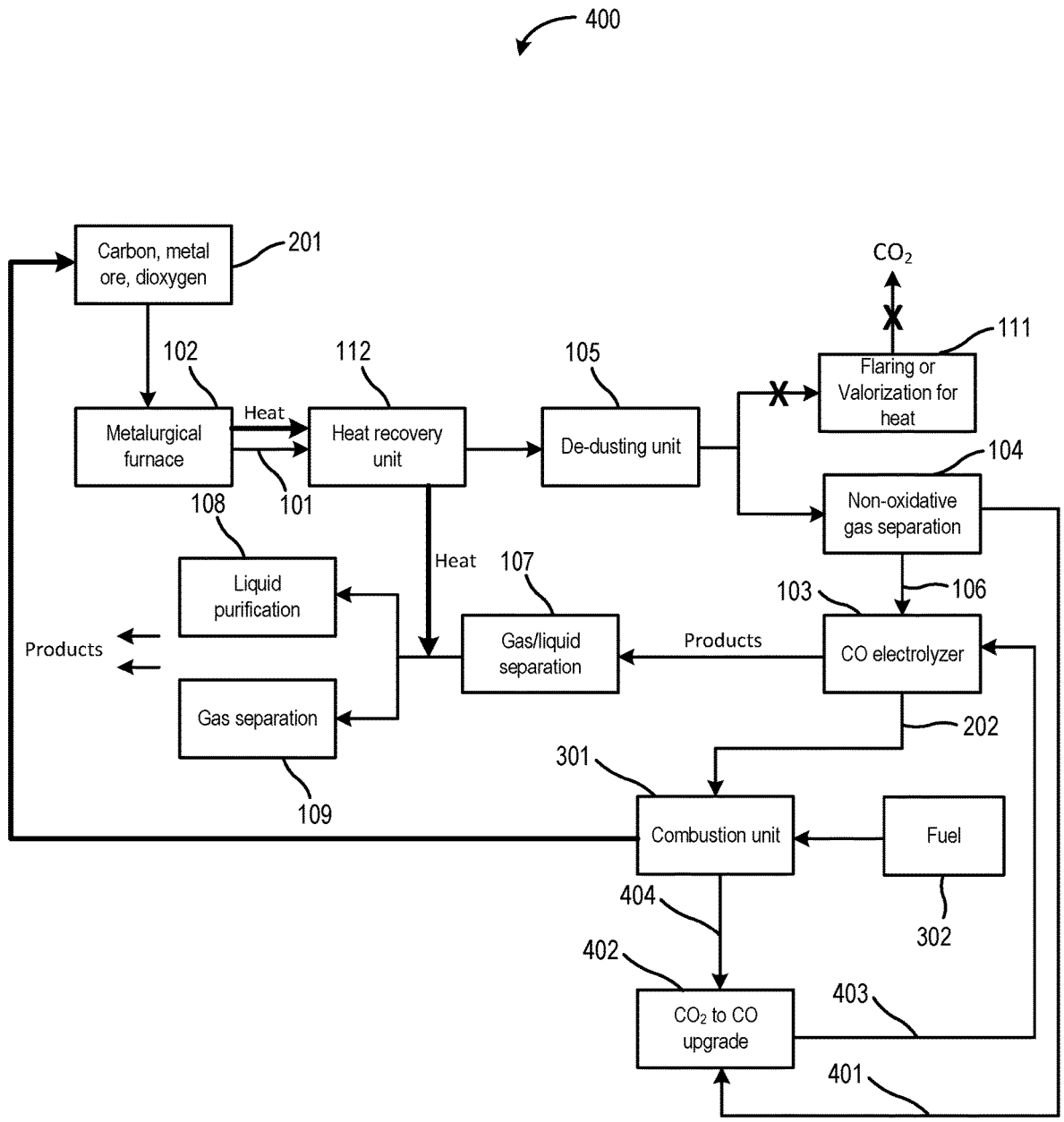
FIG. 4 illustrates a system for valorizing a volume of CO of an off-gas stream from a metallurgical furnace using a CO electrolyzer where $CO_2$ from the off-gas is valorized into CO which is also provided to the CO electrolyzer in accordance with specific embodiments of the inventions disclosed herein.

Upon complete and/or partial oxidation, the CO and $CO_2$ produced by the combustion process in a metallurgical furnace can be purified and enriched using gas separation systems. The CO can be supplied to a downstream CO electrolyzer to produce valuable products, and the $CO_2$ can be valorized into CO or sequestered. The $CO_2$ can be valorized via thermochemical, electrochemical, or plasma-based processes such as but not limited to solid-oxide electrolysis, RWGS, direct $CO_2$ hydrogenation, or low-temperature $CO_2$ electrolysis. In specific embodiments of the invention, the $CO_2$ used to supply the $CO_2$ to CO conversion process can be sourced from subunits other than the combustion unit, such as the non-oxidative gas separation units. In specific embodiments of the invention, one or more nonoxidative separation units can be employed between the $CO_2$ to CO conversion subunit and the CO electrolyzer subunit to improve the performance of the CO electrolyzer. In specific embodiments of the invention, the reducing equivalents required to convert the $CO_2$ to CO can be sourced from elsewhere in the process chain, such as in the case of sourcing dihydrogen from the metallurgical furnace or the CO electrolyzer. FIG. 4 illustrates a system 400 with similar elements to system 100 in which a volume of $CO_2$ 401 is fed back to a $CO_2$ valorization system 402 to produce an additional CO rich stream 403 that can be provided to CO electrolyzer 103. In system 400, the combustion unit 301 from FIG. 3 is also included and it produces a carbon dioxide stream 404 that can likewise be processed by $CO_2$ valorization system 402.

Figure 5:
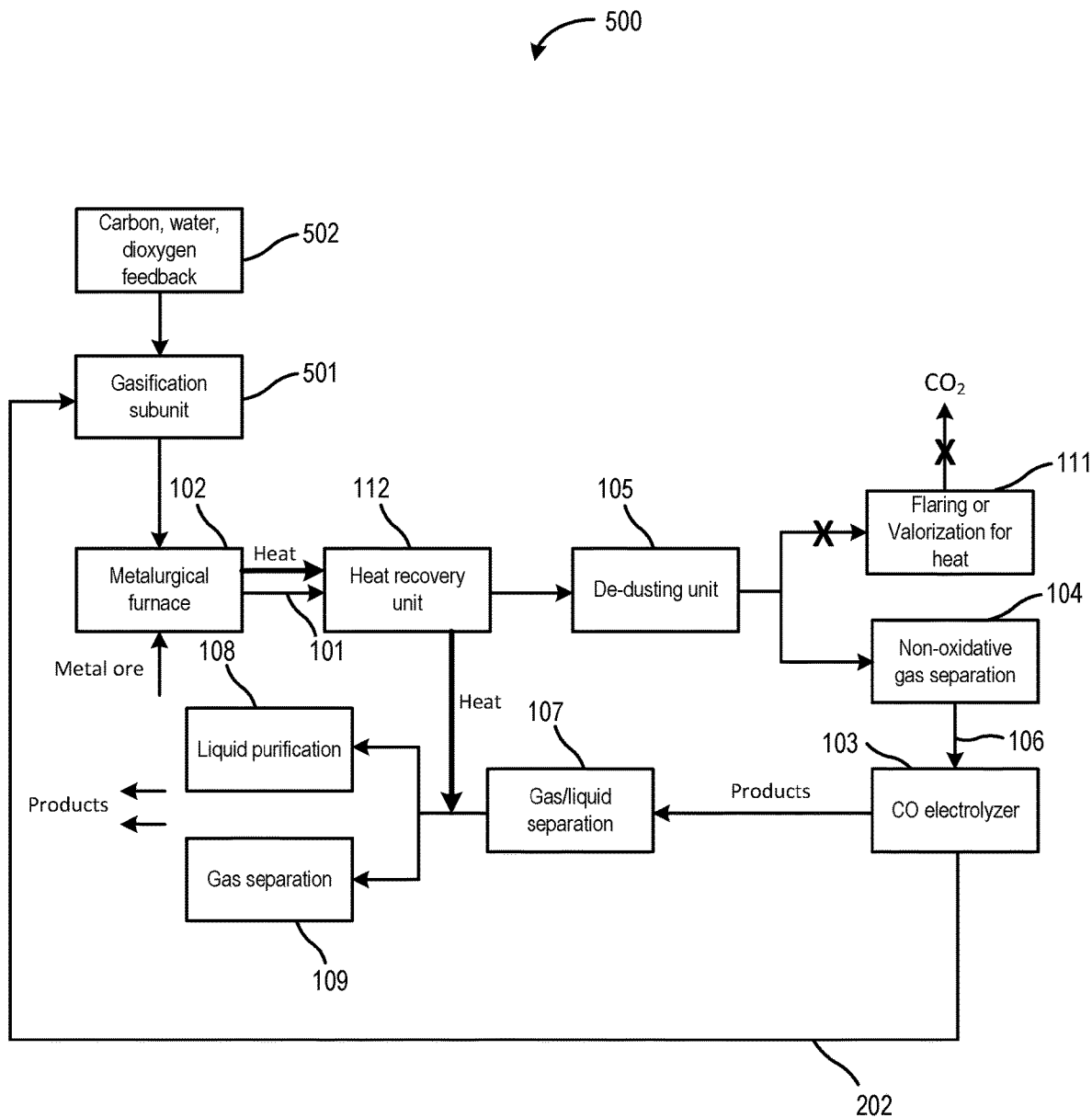
FIG. 5 illustrates a system for valorizing a volume of CO of an off-gas stream from a metallurgical furnace using a carbon monoxide electrolyzer where dioxygen produced by the CO electrolyzer is circulated to a gasification process to generate a feedstock for the metallurgical furnace in accordance with specific embodiments of the inventions disclosed herein.

In specific embodiments of the invention, the dioxygen from the CO electrolyzer is provisioned into a carbon gasification system integrated into the metal-producing furnace process chain to improve the process efficiency of the carbon gasification system. Gasification involves the partial oxidation of a carbonaceous feedstock using dioxygen and water as the oxidant to produce CO and dihydrogen. To enable the gasification of carbon, water and dioxygen are obtained either from air or a more purified dioxygen stream, and the process is conducted at high temperature. Tuning the dioxygen content depending on desired process conditions is critical to optimize gasification efficiency. In turn, the CO produced by the gasification process can be provisioned into a CO electrolyzer to produce valuable chemicals. FIG. 5 illustrates a system 500 with similar elements to system 100 in which a volume of oxygen 202 in the form of purified $O_2$ is fed back to a gasification subunit 501 which is used to produce syngas for metallurgical furnace 102. The volume of oxygen 202 is used in combination with a mixture of carbon, water and dioxygen 502 to produce the syngas for the metallurgical furnace. The gasification feedstock can be of fossil or non-fossil origin such as from biological origin such as but not limited to biomass. It can also be from carbonaceous waste origin such as but not limited to plastic waste.

Figure 6:
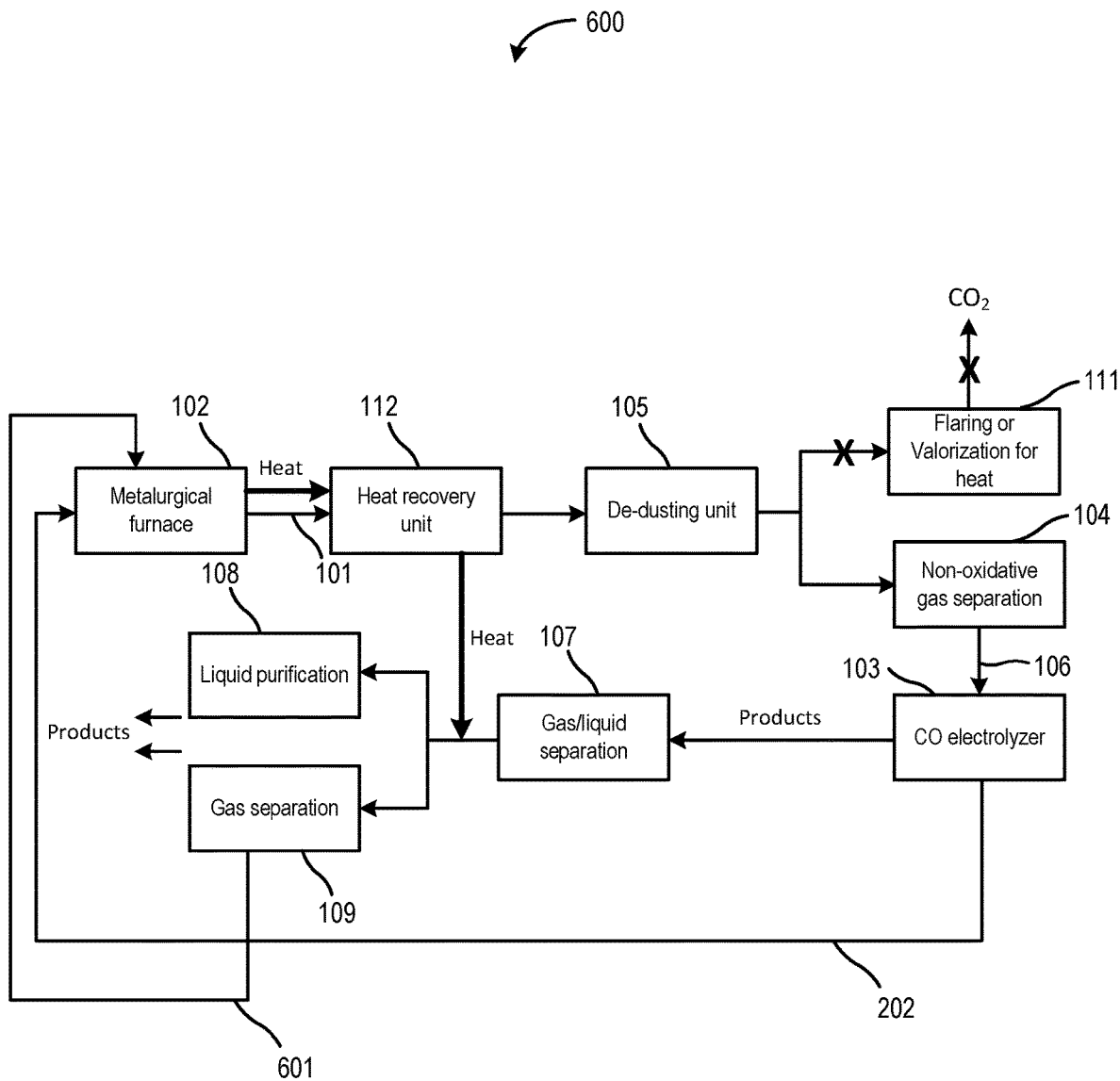
FIG. 6 illustrates a system for valorizing a volume of CO of an off-gas stream from a metallurgical furnace using a CO electrolyzer where dihydrogen separated from the products of the CO electrolyzer is circulated to the metallurgical furnace in accordance with specific embodiments of the inventions disclosed herein.

In specific embodiments of the invention, dihydrogen is collected from the CO electrolyzer and used as a feedstock for metallurgical furnace. For example, the metallurgical furnace could be a BF or DRI furnace or any smelting furnace. The dihydrogen can serve as a chemical reductant to transform the metal ore, or as a combustible material to provision heat to the furnace. In metallurgical furnaces, combustible and reducing material is used to provide heat and/or drive the process to produce purified metal products. This combustible and reducible feedstock is typically in the form of a fossil carbon feedstock. The use of parasitic dihydrogen from a CO electrolyzer can reduce the fossil carbon feedstock demand of a metallurgical furnace (thus lowering the process carbon footprint and reducing carbon feedstock costs), while valorizing the dihydrogen product of the CO electrolyzer. Prior to provision into the metallurgical furnace, a conditioning system including subsystems such as but not limited to compressors, dehumidifiers, and metering systems can be introduced into the upstream to control the characteristics of the dioxygen feed, such as but not limited to pressure, humidity, temperature, and flow rate. FIG. 6 illustrates a system 600 with similar elements to system 200 in which a volume of dihydrogen 601 is fed back to a hydrogen port of metallurgical furnace 102 to serve as a combustible fuel source for increasing the temperature of the furnace or to serve as a reducing substrate for the process in the furnace. In the illustrated case, the volume of dihydrogen 601 is separated from the output of the CO electrolyzer 103 using gas separation unit 109.

In the specific case of metallurgical furnaces in the form of BF or DRI furnaces, dihydrogen is a necessity. This dihydrogen is typically generated using energy intensive processes and serves as restriction on the use of BF and DRI furnaces. Accordingly, recirculating dihydrogen from subunits elsewhere in the process chain, as in system 600, is an important feature of specific embodiments of the inventions disclosed herein for reducing the energy demand of BF or DRI furnaces and the overall integrated system. The dihydrogen from the CO electrolyzer can also be used in such furnaces alongside hydrogen generated through any other route.

The dihydrogen that is recirculated in these embodiments can be dihydrogen from the off-gas stream 101 of the furnace, and/or dihydrogen that is produced in the CO electrolyzer 103 as is illustrated by the circulation of both volume of oxygen 202 and volume of dihydrogen 601. The recirculation of dihydrogen within and back into the BF or DRI furnaces maximizes the utilization of dihydrogen fed into the BF or DRI process, reducing the amount of dihydrogen that would otherwise have to be supplied exogenously. This also represents an opportunity to recover energy losses associated with the parasitic generation of dihydrogen during CO electrolysis. CO electrolyzers can exhibit Faradaic efficiencies towards dihydrogen generation up to 80%, meaning that depending on operating conditions, a substantial portion of supplied electric power is lost to the reduction of water or protons to dihydrogen. Dihydrogen derived from CO electrolysis can be valorized by separating it from the other components of the CO electrolysis. However, such processes may not be economically viable because of the high cost of producing dihydrogen using an electrolyzer optimized for CO reduction relative to an electrolyzer optimized for dihydrogen generation. Additionally, valorizing dihydrogen into commercial grade may require other downstream capital equipment and process steps, such as compression and transportation, that may be prohibitive to implement for the operator of a CO electrolysis plant. Thus, the energy losses associated with generating parasitic dihydrogen during CO electrolysis can be partially recovered using a BF or DRI furnace unit while simultaneously reducing the exogenous dihydrogen demand of the BF or DRI furnace, translating to process synergy.

In specific embodiments of the invention, a CO electrolysis process downstream of the BF or DRI furnace can produce sufficient dihydrogen to supply the BF or DRI process, reducing the demand on upstream dihydrogen sources and on carbon feedstock. In these embodiments, the CO electrolyzer is operated at high current densities (e.g., above 200 mA cm$^{-2}$) with a high proportion (>20%) of dihydrogen at its output, increasing the productivity of the integrated process while reducing capital expenditures on the size of the CO electrolyzer, in addition to reducing the demand of the DRI furnace on an upstream process providing dihydrogen (e.g., such as a dedicated dihydrogen electrolyzer or an industrial dihydrogen waste stream). Reduced upstream dihydrogen demand also enables more flexible and cost-effective integration scenarios, such as integration with smaller upstream dihydrogen sources, reduced demand for renewable power and associated infrastructure, and reduced minimum capital intensity for project viability. In specific embodiments of the invention, the CO electrolyzer produces sufficient dihydrogen such that no additional dihydrogen is provided to the process chain, and all the dihydrogen required is generated by the CO electrolyzer and separation unit.

Heat coming from the metallurgical furnaces can be valorized, reducing the heat demand of process subunits. A key feature of a metallurgical furnace is the high exothermicity of the combustion and reduction reactions, which produces a large amount of heat. The gas stream leaving the metallurgical furnaces is typically at high temperature, and thus it can be harvested using heat exchangers to power downstream processes such as gas separation and compression and/or liquid product distillation. The heat can also be used to preheat the process gas stream of the metallurgical furnaces or circulated in a compartment around the metallurgical furnace to provide process insulation. Additionally, the heat from the furnaces can also be used to supply a $CO_2$ capture process used to capture and sequester the $CO_2$ or to valorize it into CO. The furnace heat can be used for downstream processes such as distillation and gas separation, or it can be valorized separately for general heating use.

The synergies obtained from the combination of metallurgical furnaces that can use dihydrogen as a feedstock and CO electrolyzers are not obvious because typical thermochemical CO upgrading processes implemented downstream of a metallurgical furnace do not produce dihydrogen and sometimes require it instead. For example, in the case of a RWGS reaction (eq. 6), methanol synthesis (eq. 7), or Fischer-Tropsch synthesis, dihydrogen is also consumed as a feedstock in the hydrogenation of $CO_2$, and typically no dihydrogen is produced by a syngas-consuming thermochemical processes. Therefore, there is limited opportunity to recover energy losses by performing a recirculation step of parasitic or excess dihydrogen because both the metallurgical furnace processes and methanol synthesis/Fischer-Tropsch synthesis processes require additional exogenous dihydrogen. In contrast, the parasitic production of dihydrogen in CO reduction provides a way to reduce the dihydrogen demand of the BF or DRI, recovering the parasitic energy loss of generating dihydrogen in the CO electrolyzer.

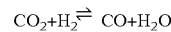

$$CO_2 + H_2 \rightleftharpoons CO + H_2O \qquad (6)\ \text{RWGS}$$

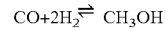

$$CO + 2H_2 \rightleftharpoons CH_3OH \qquad (7)\ \text{MeOH synthesis}$$

In specific embodiments of the invention, a CO electrolyzer is combined with more than one type of metallurgical furnace to produce synergistic results. For example, a CO electrolyzer can be used in combination with a BF and BOF furnace to improve the efficiency of the integrated process chain. The CO rich stream for the CO electrolyzer can come from more than one metallurgical furnace.

In specific embodiments of the invention, dioxygen is recycled from a BOF and provisioned into another process that can use the dioxygen, such as a DRI, BF, or EAF furnace. Such an integration can use excess oxygen that is unconverted from use in a BOF for further use in a process that can benefit from oxygen enrichment as described above. The recirculation and provision of the dioxygen from the BOF can be performed in parallel or in combination with the provision of dioxygen from the CO electrolyzer.

Figure 7:
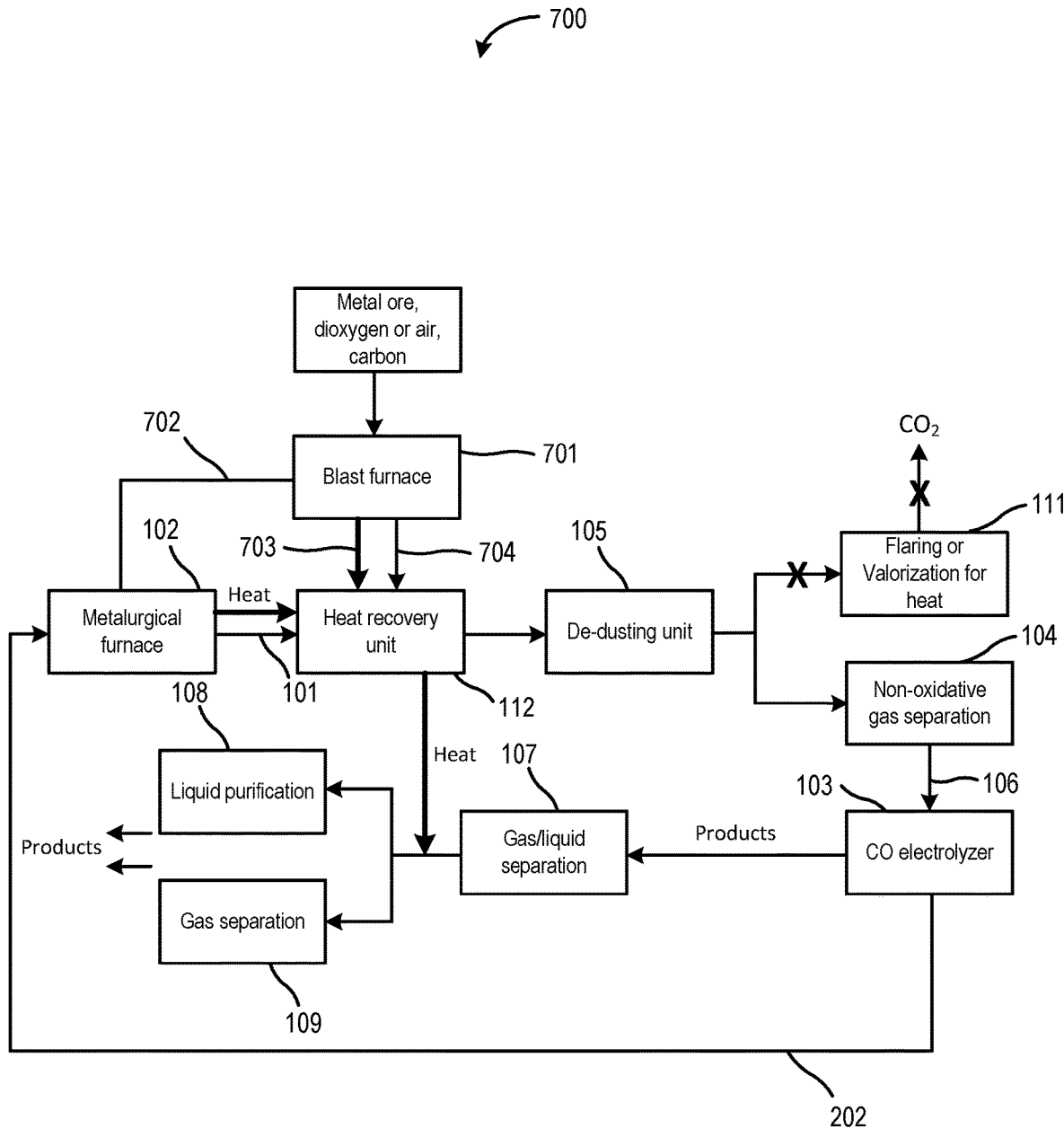
FIG. 7 illustrates a system for valorizing a first volume of CO and a second volume of CO from the off-gas streams from a first metallurgical furnace and a second metallurgical using a carbon monoxide electrolyzer in accordance with specific embodiments of the inventions disclosed herein.

FIG. 7 illustrates system 700 that serves as an example of how a CO electrolyzer and the processing systems disclosed herein can be used to augment process lines having more than one metallurgical furnace. As illustrated, system 700 includes a blast furnace 701 that is separate from metallurgical furnace 102. The two furnaces are used to first make pig iron 702 with the blast furnace 701 and then to make iron steel with metallurgical furnace 102 using the pig iron 702. In system 700 blast furnace 701 operates on a combination of metal ore and carbon in addition to either dioxygen or air and produces heat 703 and a CO-rich gas stream 704. In the illustrated system, the CO-rich gas stream 704 can be treated downstream in combination with the CO from the off-gas stream 101 from metallurgical furnace 102 and the heat 703 from blast furnace 701 can be valorized and processed similarly to the heat from metallurgical furnace 102. In system 700, and in other systems which utilize two separate metallurgical furnaces, the conduits from the furnaces to the first portion of the rest of the system that is common to the downstream paths from each of the furnaces (e.g., heat recovery unit) can include storage units to hold the off-gases from the furnace (or other downstream gases or other chemicals) to hold the chemicals temporarily until the rest of the system has sufficient bandwidth. For example, a CO electrolyzer that is downstream of both metallurgical furnaces can be configured to pull gas from a storage system for one metallurgical oven while the other metallurgical oven is not producing additional CO. These approaches can be extended to systems with multiple CO electrolyzers and/or multiple metallurgical furnaces.

In specific embodiments of the invention, the integration of a CO electrolyzer with one or more metallurgical furnaces can synergistically lower the carbon footprint of the process chain while providing a revenue stream to incentivize the conversion of the furnaces' carbon emissions. In such embodiments, the CO-rich stream can be sourced from one of at least a pair (or a series of) parallel metallurgical furnaces of the same or differing types, and dihydrogen can be sourced to a metallurgical furnace that does not produce an appreciable amount of CO. For example, a coal-fed BOF process can produce CO, which is supplied to the CO electrolyzer after conditioning and separation steps while in parallel, a BF or DRI unit that takes dihydrogen as feedstock can source dihydrogen from the CO electrolyzer following the separation of the dihydrogen from the CO electrolyzer product stream. In such an integrated process, the CO electrolyzer valorizes the CO stream produced by one furnace, and in turn provisions dihydrogen and dioxygen required by one or more other metallurgical furnaces in the process chain, translating to cost savings across the process chain.

A CO electrolyzer in accordance with embodiments disclosed herein can have various architectures for the conversion of CO into valuable chemicals. The electrolyzer can include an anode area and a cathode area. CO can be provided to the anode area. The useful chemicals can be produced in the cathode area, in the anode area, or in a separating area located between the cathode area and the anode area of the electrolyzer. The electrolyzer can be a single planar electrolyzer. The electrolyzer can be a stack of cells. The cells in the stack can utilize bipolar plates. The bipolar plates can be charged to initiate reactions within the reactor. The electrolyzer can also be a filter press electrolyzer or a tubular electrolyzer.

In specific embodiments of the inventions disclosed herein, metallurgical furnaces are advantageously integrated with a CO electrolyzer comprising a cathode area where CO reduction takes place according to equation 8 below and an anode area where an oxidation reaction takes place on an oxidation substrate, or an oxidation substrate/catalyst combination based on earth-abundant elements, precious elements, or combination of both. The oxidation substrate can be water, dihydrogen, halides, organic waste or any other oxidation substrate. For example, the oxidation reaction can involve water oxidation or dihydrogen oxidation according to equations 9 and 10 below, respectively.

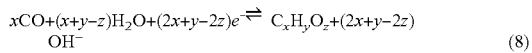

$$xCO + (x+y-z)H_2O + (2x+y-2z)e^- \rightleftharpoons C_xH_yO_z + (2x+y-2z)OH^- \quad (8)$$

$$2H_2O \rightleftharpoons 4H^+ + 4e^- + O_2 \quad (9)$$

$$H_2 \rightleftharpoons 2H^+ + 2e^- \quad (10)$$

Both the CO and the oxidation substrate can be mixed with additive chemicals to alter the characteristics of the reactor and change the characteristics of the chemicals produced by the electrolyzer. CO electrolysis can be performed in various electrolyzers, including but not limited to flow-cell and membrane-electrode-assembly (MEA) electrolyzers. In flow-cell electrolyzers, reactant CO and electrolyte (water along with dissolved salts including but not limited to potassium hydroxide, sodium hydroxide, cesium hydroxide, lithium hydroxide) are decoupled by a gas diffusion electrode, thus overcoming the CO mass transport limitation and achieving industrially relevant production rates at the cathode. In flow-cell electrolyzers, the anodic reaction is an oxidation reaction, including but not limited to water oxidation, dihydrogen oxidation, chloride oxidation, halide oxidation, hydrocarbon oxidation, and waste organic oxidation. In the flow-cell electrolyzers, the cell is fed with electrolyte through both the anode and cathode compartments, or only through its anode compartment, or only through its cathode compartment. The anodic reaction can be performed on carbon (such as but not limited to carbon cloth, carbon paper, carbon felt) or metal-based substrates/catalysts including but not limited to Ir, Ni, Pt, Fe, Ti, Ru, Co. In zero-gap, membrane-electrode assembly electrolyzers, water vapor (either in the pure form or along with dissolved salts, including but not limited to potassium hydroxide, sodium hydroxide, cesium hydroxide) and reactant CO can be fed into the cathode inlet, while an oxidation substrate/catalyst such as water or dihydrogen is provided—optionally along with other species such as dissolved salts—on another connection coupled to an anode input of the electrolyzer.

The chemicals produced by the electrolyzer can vary in different embodiments of the invention. The chemicals can be separated using a separating element such as a trap for liquid chemicals on the anodic or cathodic output of the electrolyzer or a separating area between the cathode area and anode area which has its own output from the electrolyzer. The chemicals produced can be removed from the electrolyzer in solid or gaseous form and can be removed from the cathodic or anodic output streams on the cathode or anode outputs of the electrolyzer, or from a separate output using a separating layer/compartment. Examples of such a separating layer are provided below. A single electrolyzer can produce chemicals in gaseous form, liquid form, or both forms. Accordingly, the volume of chemicals generated could include at least one of a volume of hydrocarbons, a volume of organic acids, a volume of alcohols, a volume of olefins and a volume of N-rich organic compounds, where the chemicals are in gaseous, liquid, or both forms. For example, the volume of generated chemicals could include a volume of gaseous hydrocarbon and a volume of liquid alcohol. As another example, the volume of generated chemicals could include a volume of gaseous hydrocarbons and a volume of organic acids. As another example, the volume of generated chemicals could include a volume of gaseous hydrocarbons and a volume of alkali metal carboxylate salts. In a specific embodiment, the main targeted products are ethylene (in the gaseous product stream) and acetic acid/acetate (in the liquid product stream). In another embodiment, the main targeted products are ethylene (in the gaseous product stream) and ethanol (in the liquid product stream). In another embodiment, the main targeted products are n-propanol and ethanol (in the liquid product stream).

In specific embodiments of the invention, the anodic reaction of the CO electrolyzer is that of water and the oxygen produced is reinjected through the oxygen injectors in the metal producing furnace to help with the formation of the foamy slag and the decarburization of the molten bath and oxidation of impurities.

In other embodiment, the oxidation reaction used at the anode is that of dihydrogen and such dihydrogen can be supplied from a hydrogen-generating system with low-carbon-footprint.

Figure 8:
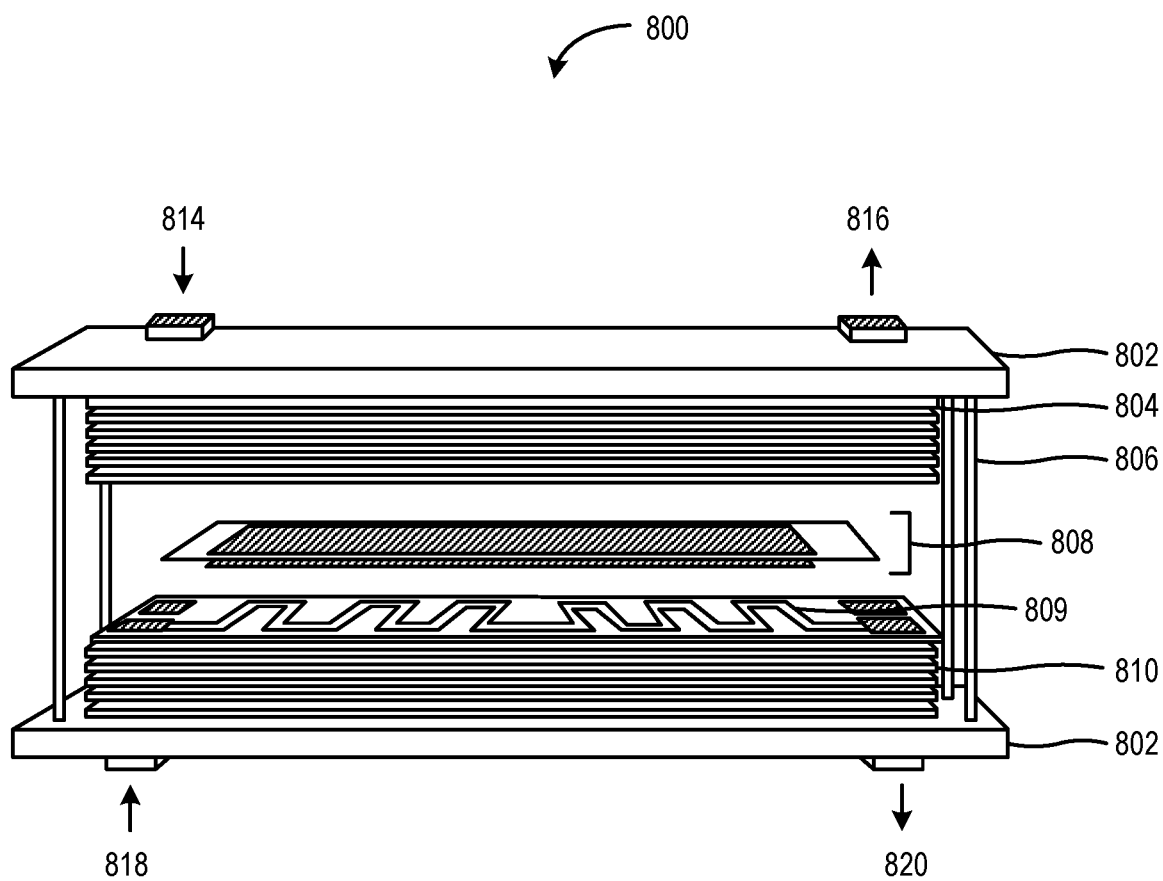
FIG. 8 illustrates an electrolyzer which can be used for the electrolysis of CO in the form of a stack in accordance with specific embodiments of the invention disclosed herein.

The CO electrolyzer used in accordance with this disclosure can comprise one or more electrocatalytic cells positioned on top or next to one another to increase the surface available for the reaction, enabling the system to achieve a higher production capacity. They can be stacked on top of one another, and such stacks can also be parallelized. These cells may be connected in series or in parallel. Many different cell and stack configurations can be used for the electrolyzers in accordance with this disclosure. FIG. 8 provides a diagram of an electrolyzer 800 for explanatory purposes. The methods and systems disclosed herein are broadly applicable to electrolyzers that can receive carbon inputs such as CO generally and electrolyzer 800 is provided as a nonlimiting example of one such an electrolyzer.

The figure illustrates an electrolyzer 800 which can be used for the electrolysis of CO in the form of a stack in accordance with specific embodiments of the invention disclosed herein. The electrolyzer 800 includes end plates such as end plate 802, monopolar plates such as monopolar plate 804, bipolar plates such as bipolar plate 810, rigid bars such as rigid bars 806, a membrane electrode assembly (MEA) such as 808 or any form of catalytic core, a flow field such as flow field 809, and bipolar plates such as 810. Again, while the example of an MEA is being provided, this is only an example, and electrolyzers with any form of catalytic cores can be used in accordance with the embodiments disclosed herein. Additionally, the stack of electrolyzer 800 includes an inlet 814 and an outlet 816 for an anodic stream, as well as an inlet 818 for a cathodic stream and an outlet 820 for the cathodic stream. The polar plates, such as monopolar plate 804 and bipolar plate 810 can be part of the cells in the stack. The stack can also comprise gasketing, sealing of any shape, insulating layers and materials that have not been represented in the figure for clarity.

In an electrolysis stack, subsequent cells can be physically separated by bipolar plates (BPPs), such as bipolar plate 810 in the figure, that can ensure mechanical support for each of the electrolysis cells on each side of the BPP. BPP can also ensure electrical series connection between subsequent electrolysis cells and introduce/remove the reactants/products respectively. At the end of the stack, only one side of the plate can be in contact with the terminal cell; it is then referred to as a monopolar plate, such as monopolar plate 804 in the figure. At the extremities of the stack, current collectors can allow connection to an external power supply, which can also be used, among other elements, for electrical monitoring of the stack. The stack can be assembled within a stack casing, allowing its mechanical support and compression, as well as provisioning and transporting the reactant and product streams to and from the stack. The stack casing can comprise end plates that ensure electrical isolation of the stack and provide the inlet and outlets for the reactant and product streams. Alternatively, insulator plates can be placed between end plate such as 802 and the monopolar plate such as 804 to ensure electrical insulation of the stack versus the stack casing depending on the material/type of the end plate.

The CO electrolyzers can take, as inputs, a cathodic input stream (e.g., stream enriched in CO) and an anode input stream. The cathodic input stream can be provided to an inlet such as inlet 818. The anodic input stream can be provided to an inlet such as inlet 814. The cathodic stream and anodic stream can flow through the stack from the inlets to the outlets and be distributed through the flow channels, such as flow field 809 of each cell to each cathodic and anodic area separately. The anodic stream and cathodic stream would flow through separate channels on either side of the cell. Alternatively, at least one of the cathodic and anodic streams may be provided to each cell individually instead of through a connection crossing all the plates. In this case, each cell has a dedicated fluid inlet and outlet for this cathodic and/or anodic stream. The nature of the anodic stream can be determined by the nature of the targeted oxidation reaction (such as, but not limited to, water oxidation, dihydrogen oxidation, chloride oxidation, halide oxidation, hydrocarbon oxidation, waste organic oxidation). When electrically powered, the CO electrolyzer carries out the concomitant reduction of CO and oxidation of the chosen oxidation substrate to produce added-value chemicals such as hydrocarbons, organic acids and/or alcohols, salts and/or N-containing organic products in the output cathodic stream separated from the anodic stream where the oxidation products are specifically collected. For example, the generating of chemicals using CO and the electrolyzer could involve supplying the volume of CO (either dry, humidified, or along with water) to a cathode area of the electrolyzer as a cathodic input fluid and supplying a volume of water (or any other input chemicals depending on the targeted oxidation reactions) to an anode area of the electrolyzer as an anodic input fluid.

In specific embodiments of the invention, the anode area could comprise an anodic catalyst layer able to oxidize a substance to produce a product and protons. The catalyst can comprise one or more of: molecular species, single-metal-site heterogeneous compounds, metal compounds, carbon-based compounds, polymer electrolytes (also referred to as ionomers), metal-organic frameworks, metal-doped or carbon-based covalent organic framework or any other additives. The molecular species can be selected from metal porphyrins, metal phthalocyanines or metal bipyridine complexes. The metal compound can be under the form of metal nanoparticles, nanowires, nano powder, nanoarrays, nano-flakes, nanocubes, dendrites, films, layers or mesoporous structures. The single-metal-site compounds can comprise a metal-doped carbon-based material or a metal-N—C-based compound. Anodic catalyst species used for this purpose could include, but are not limited to, metals and/or ions of: Ir, Co, Cu, Ni, Fe, Pt, Rh, Re, Ru, Pd, Os, Mo and mixture and/or alloys thereof. For example, the anodic catalyst could be Ni such that the electrolyzer assembly included a nickel-based anode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, and Cl. The additives can be specifically dedicated to modify hydrophobicity such as through treatment with polytetrafluoroethylene (PTFE), cation-exchange ionomers (Nafion or another hydrophobic polymeric ionomer additive), anion-exchange ionomers, or carbon black. The anodic catalyst may be chosen to tune the performance and net product stream of the electrolyzer by choosing catalysts that are more or less capable of anodic alcohol oxidation to the corresponding carboxylic acid, aldehyde, or $CO_2$.

The anodic catalyst may be deposited onto a gas diffusion layer or a porous transport layer or any other carbon, carbon-based, or metallic support that facilitates the diffusion of gas from the interface of the anode to a purified gas stream separated from the cathodic stream. The anode area could also include a gas diffusion layer with one or more separators such as but not limited to membranes, polymeric materials, diaphragm, and inorganic materials on its borders as described below.

In specific embodiments of the invention, the cathode area could comprise a catalyst layer able to reduce a substance (e.g., CO) to generate value-added hydrocarbons/alcohols/organic acids. The catalyst can comprise one or more: molecular species, single-metal-site heterogeneous compounds, metal compounds, carbon-based compounds, polymer electrolytes (also referred to as ionomers), metal-organic frameworks, or metal-doped covalent organic frameworks or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures, with precisely chosen particle sizes to control performance. The single-metal-site compounds can comprise a metal-doped carbon-based material or a metal-N—C-based compound. The cathode catalyst may be made of a metal or metal ion from metals such as, but not limited to, Cu, Ag, Au, Zn, Sn, Bi, Ni, Fe, Co, Pd, Ir, Pt, Mn, Re, Ru, La, Tb, Ce, Dy or other lanthanides and mixture and/or alloys thereof. For example, the cathodic catalyst could comprise Cu such that the electrolyzer assembly included a copper-based cathode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, Cl. The additives can be specifically dedicated to modify the hydrophobicity such as through treatment with hydrophobic agents (such as but not limited to PTFE), cation-exchange polymers (such as but not limited to Nafion) or another hydrophobic polymeric ionomer additives, or carbon black. The cathode may further comprise a catalyst layer on a gas diffusion layer, a porous transport layer, or any other support, which facilitates the diffusion of the gas from a stream to the surface of the catalyst, as well as allowing the removal of non-reacted/product gases. The cathode area could also include a gas diffusion layer with one or more separators such as, but not limited to, membranes, polymeric materials, diaphragms, and inorganic materials on its borders as described below. The loading of catalyst and additives on the gas diffusion layer can be precisely varied to favor certain performance characteristics, such as differences in voltage, conductivity, CO mass transport rate, product selectivity, reaction rates, production rates, output gas/liquid concentration, energy efficiency, single-pass carbon conversion efficiency, and operational stability.

In specific embodiments of the invention, the porous support for either the anode area, the cathode area, or both, can be selected from carbon-based porous supports or metal-based porous material or a combination. The carbon-based porous support can be based on carbon fibers, carbon cloth, carbon felt, carbon fabric, carbon paper, molded graphite laminates and the like or a mixture thereof. The carbon-based porous support can be a gas diffusion layer with or without microporous layer. Such carbon-based supports can be manufactured home-made such as but not limited to spray-coating, doctor-blading, roll-coating, followed by heat treatment in a wide range of temperatures (150 C to 350 C) for a wide range of durations from 1 hour to 48 hours. The home-made carbon-based supports could include carbon or carbon-derived nanoparticles, nanotubes, and nanowires as well as other hydrophobic agents and chemical additives, including but not limited to PTFE. Besides the home-made carbon based supports, such carbon-based support can also be any materials from the following list: Sigracet 39AA, Sigracet 39BC, Sigracet 39BB, Sigracet 39BA, Sigracet 36AA, Sigracet 36BB, Sigracet 35BC, Sigracet 35BA, Sigracet 29BA, Sigracet 28BB, Sigracet 28AA, Sigracet 28BC, Sigracet 25BC, Sigracet 22BB, Sigracet 35BI, Toray papers, Toray THP-H-030, Toray TGP-H-060, Toray TGP-H-090, Toray TGP-H-120, Freudenberg H23C6, Freudenberg H15C13, Freudenberg H15C14, Freudenberg H14C10, Freudenberg H14CX483, Freudenberg H14CX653, Freudenberg H23C2, Freudenberg H23CX653, Freudenberg H24CX483, Freudenberg H23C6, Freudenberg H23C8, Freudenberg H24C5, Freudenberg H23C3, Avcarb MB-30, Avcarb GDS5130, Avcarb GDS2130, Avcarb GDS3250, Avcarb GDS3260, Avcarb GDS2230, Avcarb GDS2240, Avcarb GDS2255, Avcarb GDS2185, AvCar 1071, AvCarb 1698, AvCarbon1209, AvCarb 1185, AvCarb1186, AvCarb 7497, AvCarb T1819, AvCarb T1820, AvCarb T1824, AvCarbon 1071, AvCarb 1698, AvCarb 1209, AvCarb 1185, AvCarb 1186, AvCarb 1186, AvCarb T1819, AvCarb T1820, AvCarb T1824, AvCarb EP40, AvCarb P75, AvCarb EP55, AvCarbon EP40T, AvCarb P75T, AvCarb EP55T, AvCarb MGL190, AvCarb MGL280, AvCarbMGL370. The metal-based porous support can be selected from titanium, stainless steel, Ni, Cu or any other suitable metal and can be under the form of mesh, frit, foam or plate of any thickness or porosity.

In specific embodiments of the invention, the electrolyzer can include a separating element to separate specific generated chemicals from others. The separating element can be one or more traps on the cathodic and/or anodic outputs of the electrolyzer which separates liquid outputs from gaseous outputs. It can also be more complex systems known by those skilled in the art for the purpose of efficient product separation. The separating element can be a separating area between the anode area and the cathode area configured to separate the volume of generated chemicals from the electrolyzer. The separating area can be a separating layer, a porous transport layer, or a compartment. Efficient physical separation of the anode area and cathode area may allow easier separation of the gases released from each section of the reactor. The separator can be an ion-conducting polymeric separator, a non-ion conducting polymeric separator, a non-ionically charged polymer, a non-ionically charged separator, an ionomer solution coated onto the electrodes, a diaphragm, a ceramic-containing material, a non-charged separator scaffold, a mixed ceramic-organic compound separator, or any other separator. Separation may occur through the use of ion-exchange membranes, which favor the diffusion of either anions (in an anion-exchange membrane) or cations (in a cation-exchange membrane), or a bipolar membrane (including a mixture of cation- and anion-exchange membranes) or other types of separators, such as diaphragms, ceramic-containing materials (in particular mixed ceramic/organic compounds), or non-charged separator scaffolds. Anion-exchange membranes can comprise an organic polymer with positively charged functionality, such as, but not limited to, imidazolium, pyridinium or tertiary amines. This allows facile migration of negatively charged ions from the cathode to the anode. These charges include but are not limited to hydroxide ($OH^-$), formate, and acetate produced during CO reduction reaction. The use of this layer also prevents the crossover of other gases from the cathode to the separating layer. Cation-exchange membranes can comprise an organic polymer with negatively charged functionality such as, but not limited to, sulfonate groups. Diaphragms or non-charged separators can be materials derived from insulating materials which may be charged with an ion-conducting electrolyte to facilitate charge transfer between electrodes. Ceramic-containing materials may be a purely ceramic or mixed polymer and ceramic material. Ceramic-polymer mixes can reach higher temperatures than purely organic polymers, thus they may take advantage of ion-exchange functionality in the polymer to pass charge between electrodes. The thickness of the membranes can be chosen precisely to control the transport rates of species such as anions, cations, and neutral species such as alcohols and water during operation.

In specific embodiments of the invention, the system can include an electrolyte that will facilitate the transportation of ions and provide ions that promote the reactions. In particular, the electrolyte may be a concentrated alkaline solution such as a solution of hydroxide-containing salt such as but not limited to potassium, sodium or cesium hydroxide with concentrations such as (0.01 molarity (M), 0.05 M, 0.1 M, 0.2 M, 0.5 M, 1 M, 2 M, 3 M, 4 M, 5 M, 6 M, 7 M, 8 M, 9 M and 10 M). The use of concentrated alkaline solution brings down the energy requirement of the overall reaction. Alkali metal cations (such as Li, Na, K, Cs, Rb) may be used as counter-cations. This electrolyte may contain oxidation substrates other than water or hydroxide, such as dihydrogen, alcohols, glycerol, other organic materials/solvents, and other oxidizable feedstocks.

In specific embodiments of this invention, a separation system is used to separate the liquid products. In particular, a distillation-based method is used to separate acetate evolved as acetate-containing solution or acetic acid-containing solution depending on the electrolyte pH. The acetate-containing or acetic-acid containing solution is separated from the product stream of the CO electrolyzer, which can include but is not limited to ethanol, n-propanol, metal propionates, methanol, allyl alcohol, and propionic acid. Such separation unit can use the heat recovered from metal-producing furnace off-gas.

In specific embodiments of the invention, the flow field can comprise a ladder, single or multiple serpentines, interdigitated patterns, pillars, bio-inspired leaf-like shapes or a mixture thereof. An electrolysis cell can also include polar plates as further discussed in this disclosure. The performance of the electrolyzer can be modulated by altering the characteristics of the flow field, specifically to prevent the buildup of condensed phases that slow down the mass transport of CO and the efflux of liquid products. For example, a larger number of flow field channels in the same area can be used to extract liquid products more efficiently from the cathode, relative to a flow field with a lower density of channels.

In specific embodiments of the invention, the electrolyzer can be operated at elevated temperature and pressure to promote the stability and performance of the electrolyzer by improving CO mass transport and product efflux. Elevated temperature can serve to evaporate liquid products present in the cathode catalyst layer, while elevated pressure can mitigate the intrusion and retention of liquids in the cathode catalyst layer. The electrolyzer can be operated under elevated pressure at both the anode and cathode compartments, or only in one compartment to precisely manage liquid and gas crossover in the electrolyzer, whilst steering the product selectivity and productivity towards a specific product or a group of products. The heat for the elevated temperature can be harvested from the metal-producing furnace such as by maintaining a temperature of the off-gas at a certain level while it is being processed and delivered to the electrolyzer in a CO-rich form.

CO humidification upstream of the CO electrolyzer can be controlled in specific embodiments of the invention. Several humidification process can be applied to a CO stream including, but not limited to, (1) steam injection in a gas stream, (2) membrane water/gas contact module, (3) water gas bubbler, (4) other water/gas contact systems including, but not limited to, sprayers and packed column. For solution (2), (3), (4), the gas outlet water content will mainly depend on the system operating conditions (pressure and temperature), the contact time and the exchange area between the two phases. In that case, to increase water content in the gas stream, it can be necessary to heat the inlet gas stream and/or the water put into contact with the gas. Solution (1) includes a steam generation module which can use energy, electricity or fuel gas in a boiler or heat harvested from the metal producing furnace. The generated steam is then mixed with the gas stream to control relative humidity. Gas stream can be pre-heated to avoid condensation in the mixing area.

Figure 9:
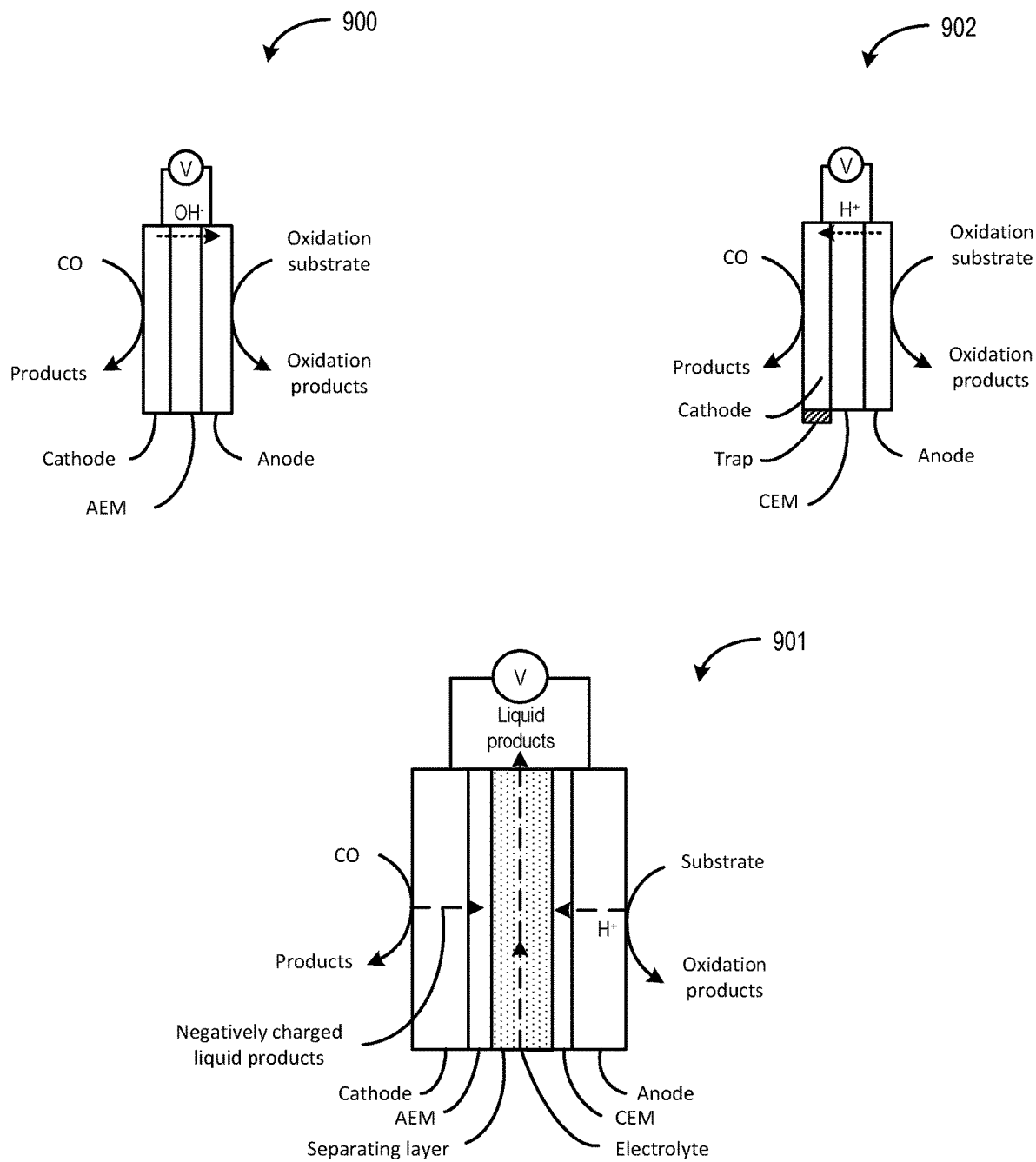
FIG. 9 illustrates a set of example reactions in CO electrolyzers using ion exchange membranes in accordance with specific embodiments of the invention disclosed herein.
Figure 10:
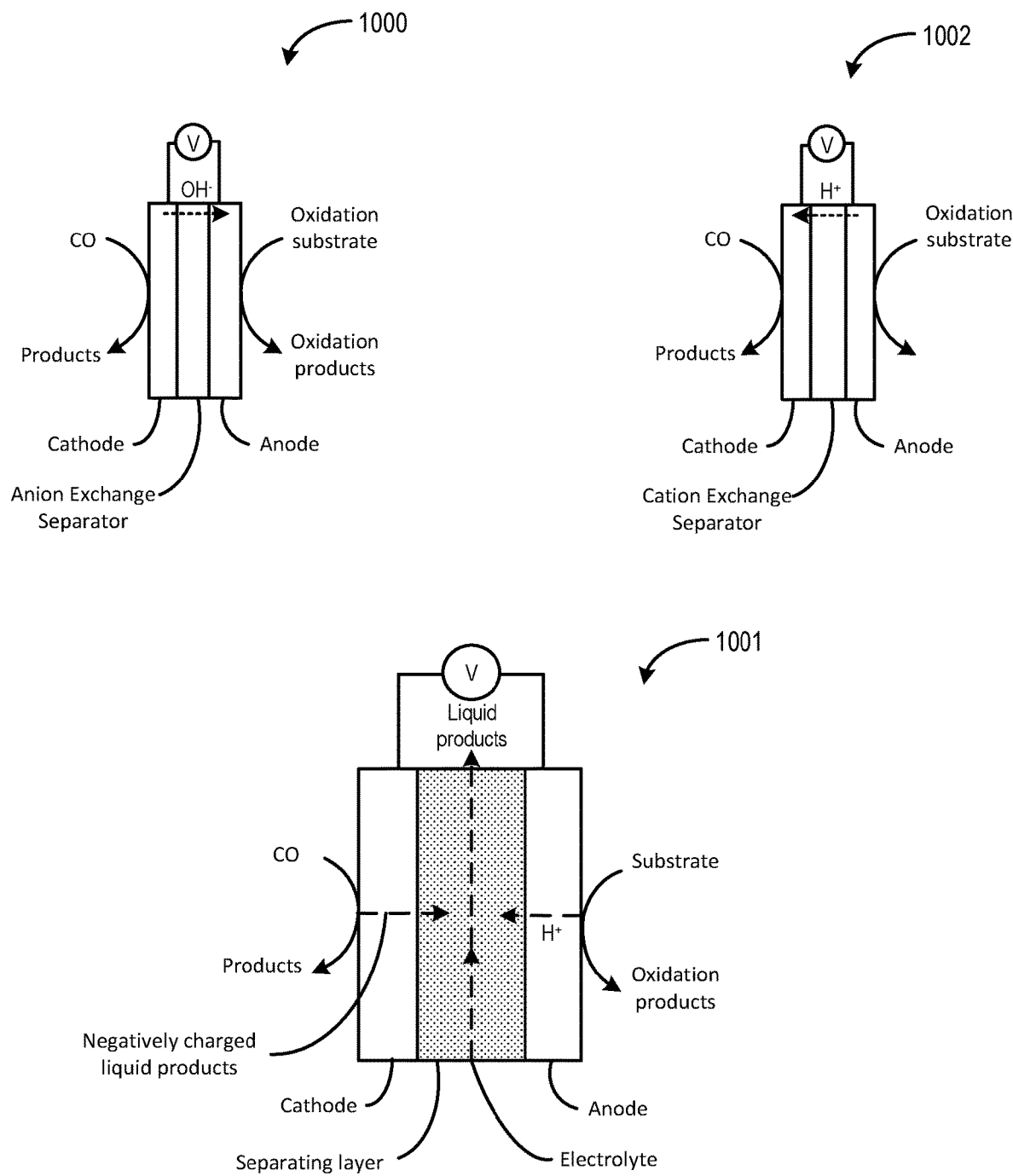
FIG. 10 illustrates a set of example reactions in CO electrolyzers using separators in accordance with specific embodiments of the invention disclosed herein.

FIGS. 9 and 10 illustrate examples of reactions that can be conducted in accordance with the electrolyzer assemblies described herein. In the diagrams, only single cells are represented for clarity but these could easily be assembled in a plurality of cells such as in a stack. In the diagrams, a CO electrolyzer consists of a cathode comprising a gas-diffusion layer and a copper-based catalyst, and the anode comprising a nickel material of any shape (such as but not limited to a foam, a mesh, a deposit onto a conductive porous transport layer (PTL), etc.). In this case, the CO reduction products include one or more of the following: methane ($CH_4$), methanol ($CH_3OH$), ethylene ($C_2H_4$), ethanol ($C_2H_5OH$), acetic acid ($CH_3COOH$), propylene ($C_3H_6$), propanol ($C_3H_8O$), oxalic acid (COOH—COOH), acrylic acid ($C_2H_3COOH$), glyoxylic acid (COH—COOH) produced according to but not limited to the following CO reduction reactions:

In neutral/alkaline conditions:

$$2CO + 6H_2O + 8e^- \rightarrow CH_2CH_2 + 8OH^- \tag{11}$$

$$2CO + 7H_2O + 8e^- \rightarrow CH_3CH_2OH + 8OH^- \tag{12}$$

$$2CO + 4H_2O + 4e^- \rightarrow CH_3COOH + 4OH^- \tag{13}$$

$$3CO + 5H_2O + 6e^- \rightarrow C_2H_3COOH + 6OH^- \tag{14}$$

$$3CO + 9H_2O + 12e^- \rightarrow C_3H_6 + 12OH^- \tag{15}$$

$$3CO + 10H_2O + 12e^- \rightarrow C_3H_8O + 12OH^- \tag{16}$$

In acidic conditions:

$$2CO + 8H^+ + 8e^- \rightarrow CH_2CH_2 + 2H_2O \tag{17}$$

$$2CO + 8H^+ + 8e^- \rightarrow CH_3CH_2OH + H_2O \tag{18}$$

$$2CO + 4H^+ + 4e^- \rightarrow CH_3COOH \tag{19}$$

$$3CO + 6H^+ + 6e^- \rightarrow C_2H_3COOH + H_2O \tag{20}$$

$$3CO + 12H^+ + 12e^- \rightarrow C_3H_6 + 3H_2O \tag{21}$$

$$3CO + 12H^+ + 12e^- \rightarrow C_3H_8O + 2H_2O \tag{22}$$

In specific embodiments, the CO stream is mixed with other gas or liquid compounds to generate higher added value products at the cathode. In one such embodiment, imines, amines, nitrogen oxides or ammonia are added to react with CO, or an intermediate formed during its reduction, to form amide bonds or N-rich organic compounds, such as amino acids or urea. Examples of such reactions are:

$$2CO + 3H_2O + NH_3 + 4e^- \rightarrow CH_3CONH_2 + 4OH^- \text{ in neutral/alkaline conditions} \quad (23)$$

$$2CO + 4H^+ + NH_3 + 4e^- \rightarrow CH_3CONH_2 + H_2O \text{ in acidic conditions} \quad (24)$$

In specific embodiments, the oxidation reaction at the anode is selected from the group consisting of reactions undertaken in an acidic environment and reactions undertaken in an alkaline environment such as but not limited to anodic reactions in an acidic environment such as:

$$2H_2O \rightarrow O_2 + 4H^+ + 4e^- \quad (25)$$

$$H_2 \rightarrow 2H^+ + 2e^- \quad (26)$$

$$Cl^- \rightarrow Cl_2 + 2e^- \quad (27)$$

$$Br^- \rightarrow Br_2 + 2e^- \quad (28)$$

$$I^- \rightarrow I_2 + 2e^- \quad (29)$$

$$C_3H_8O_3 \text{ (glycerol)} \rightarrow C_3H_6O_3 \text{ (glyceraldehyde)} + 2H^+ + 2e^- \quad (30)$$

$$C_3H_8O_3 \text{ (glycerol)} + H_2O \rightarrow C_3H_5O_4^- \text{ (glycerate)} + 5H^+ + 4e^- \quad (31)$$

$$C_3H_8O_3 \text{ (glycerol)} + 3/2 H_2O \rightarrow 3/2\ C_2H_3O_3^- + 13/2 H^+ + 5e^- \quad (32)$$

$$C_3H_8O_3 \text{ (glycerol)} + 3H_2O \rightarrow 3\ HCOO^- \text{ (formate)} + 11H^+ + 8e^- \quad (33)$$

$$C_3H_8O_3 \text{ (glycerol)} + 3H_2O \rightarrow 3/2\ C_2O_4^{2-} + 14H^+ + 11e^- \quad (34)$$

and anodic reactions in neutral/alkaline environments such as:

$$4OH^- \rightarrow O_2 + 2H_2O + 4e^- \quad (35)$$

$$H_2 + 2OH^- \rightarrow 2H_2O + 2e^- \quad (36)$$

$$Cl^- \rightarrow Cl_2 + 2e^- \quad (37)$$

$$Br^- \rightarrow Br_2 + 2e^- \quad (38)$$

$$I^- \rightarrow I_2 + 2e^- \quad (39)$$

$$C_3H_8O_3 \text{ (glycerol)} + 2OH^- \rightarrow C_3H_6O_3 \text{ (glyceraldehyde)} + 2H_2O + 2e^- \quad (40)$$

$$C_3H_8O_3 \text{ (glycerol)} + 5OH^- \rightarrow C_3H_5O_4^- \text{ (glycerate)} + 4H_2O + 4e^- \quad (41)$$

$$C_3H_8O_3 \text{ (glycerol)} + 13/2 OH^- \rightarrow 3/2\ C_2H_3O_3^- + 5H_2O + 5e^- \quad (42)$$

$$C_3H_8O_3 \text{ (glycerol)} + 11OH^- \rightarrow 3HCOO^- \text{ (formate)} + 8H_2O + 8e^- \quad (43)$$

$$C_3H_8O_3 \text{ (glycerol)} + 14OH^- \rightarrow 3/2\ C_2O_4^{2-} + 11H_2O + 11e^- \quad (44)$$

$$\text{Ethanol oxidation: } C_2H_5OH + 5OH^- \rightarrow CH_3COO^- + 4H_2O + 4e^- \quad (45)$$

$$\text{Propanol oxidation: } C_3H_7OH + 5OH^- \rightarrow CH_3CH_2COO^- + 4H_2O + 4e^- \quad (46)$$

In specific embodiments of the inventions disclosed herein, the CO electrolyzer includes one or more ion exchange membranes chosen among anion-exchange membranes (such as, but not limited to, commercial Ionomr®, Orion®, Sustainion®, Piperion®, ionomer anion-exchange membranes), proton-exchange membranes (such as but not limited to Nafion®, Aquivion® or commercial membranes), bipolar membranes (such as, but not limited to, Fumasep® FBM and Xion®). In specific embodiments of the invention, the membrane in an anion-exchange membrane is prepared using N-bearing monomers. In the example of reactor 900, the electrolyzer includes an anion exchange membrane and hydroxide moves from the cathode to the anode. The oxidation product depends on the oxidation substrate, while the product harvested from the cathode output can be any of the generated chemicals mentioned above. In the example of reactor 902, the electrolyzer includes a cation exchange membrane and protons move from the anode to the cathode. The oxidation product again depends on the oxidation substrate, while the product harvested from the cathode output can be any of the generated chemicals mentioned above.

In specific embodiments of the inventions disclosed herein, the electrolyzer can include a separating layer. In the example of reactor 901, the CO electrolyzer comprises a central separating layer in which an electrolyte fluid is circulated allowing the collection of liquid carbon-monoxide-reduction products that migrate from the cathode toward the central separating layer. In specific embodiments, the central separating layer is either separated from the cathode by an anion-exchange membrane or from the anode by a cation-exchange membrane, or both membranes are present. In the example of reactor 901, both membranes are present. In this example, useful products can be harvested both from the liquid stream in from the separating layer and a gaseous stream from the cathode output. For example, the CO could be used by the electrolyzer to produce one or more of the following: ethylene ($C_2H_4$), ethanol ($C_2H_5OH$), acetate ($C_2H_3O_2^-$), acetic acid ($CH_3COOH$), propylene ($C_3H_6$), propanol ($C_3H_8O$). In a specific embodiment, the main targeted product is ethylene (in the gaseous product stream). In another specific embodiment, the main targeted products are ethylene (in the gaseous product stream) and ethanol (in the liquid product stream). In another specific embodiment, the main targeted products are ethylene (in the gaseous product stream) and acetic acid/acetate (in the liquid product stream). For example, in reactor 902, a trap is located at the cathodic output which separates liquid products from gaseous products such that they can both be collected. In these examples, the oxidation occurring at the anode could be water/hydroxide oxidation, dihydrogen oxidation, or chloride oxidation. Notably, in a physical system the trap is located on the connection to the outlet of the cathode such as to piping that is connected to the cathode, and the trap is drawn connected to the cathode area for diagrammatic purposes only.

The examples illustrated in FIG. 10 are similar to those of FIG. 9 in terms of the overall theory of the reactor. However, the approaches in FIG. 10 operate without the use of exchange membranes and instead operate with separating layers that achieve similar effects. Reactor 1000 is similar to that of reactor 900 in that hydroxide ions move from the cathode to the anode and generated products can be harvested from the cathode output. Reactor 1001 is similar to that of reactor 901 in that the separating layer includes a liquid electrolyte and useful products can be harvested both from the output of the separating layer in liquid form and from an output of the cathode area in fluid form. Reactor 1002 is similar to that of reactor 902 in that protons migrate across the separating layer and useful products can be harvested from the output of the cathode.

In specific embodiments of the invention, a porous diaphragm can be used in the electrolyzer as a separation element to achieve separation. The diaphragm can be saturated with an electrolyte which allows ions to cross between the cathode and anode. The diaphragm can allow ions to cross from the anode to the cathode and/or ions to cross from the cathode to the anode.

In specific embodiments of the invention, a CO stream is mixed with at least one other chemical such as other gas or liquid compounds to generate higher added value products at the cathode of an electrolyzer. The CO stream can be mixed with such additive chemicals at the time the CO is supplied to the electrolyzer. In one such embodiment, imines, amines, nitrogen oxides, or ammonia are added to react with CO, or an intermediate formed during its reduction, to form amide bonds or nitrogen rich organic compounds, such as amino acids. In another embodiment, aromatic or aliphatic acids/aldehydes/alcohols are added to react with CO, or an intermediate formed during its reduction, to form hydrocarbons, alcohols or organic acids. In another embodiment, aromatic or aliphatic olefins or hydrocarbons are added to react with CO, or an intermediate formed during its reduction, to form hydrocarbons, alcohols or organic acids. These reactions can be combined with any of the reactors mentioned above. For example, the oxidation occurring at the anode can be water oxidation, hydroxide oxidation, dihydrogen oxidation, or halide oxidation.

Figure 11:
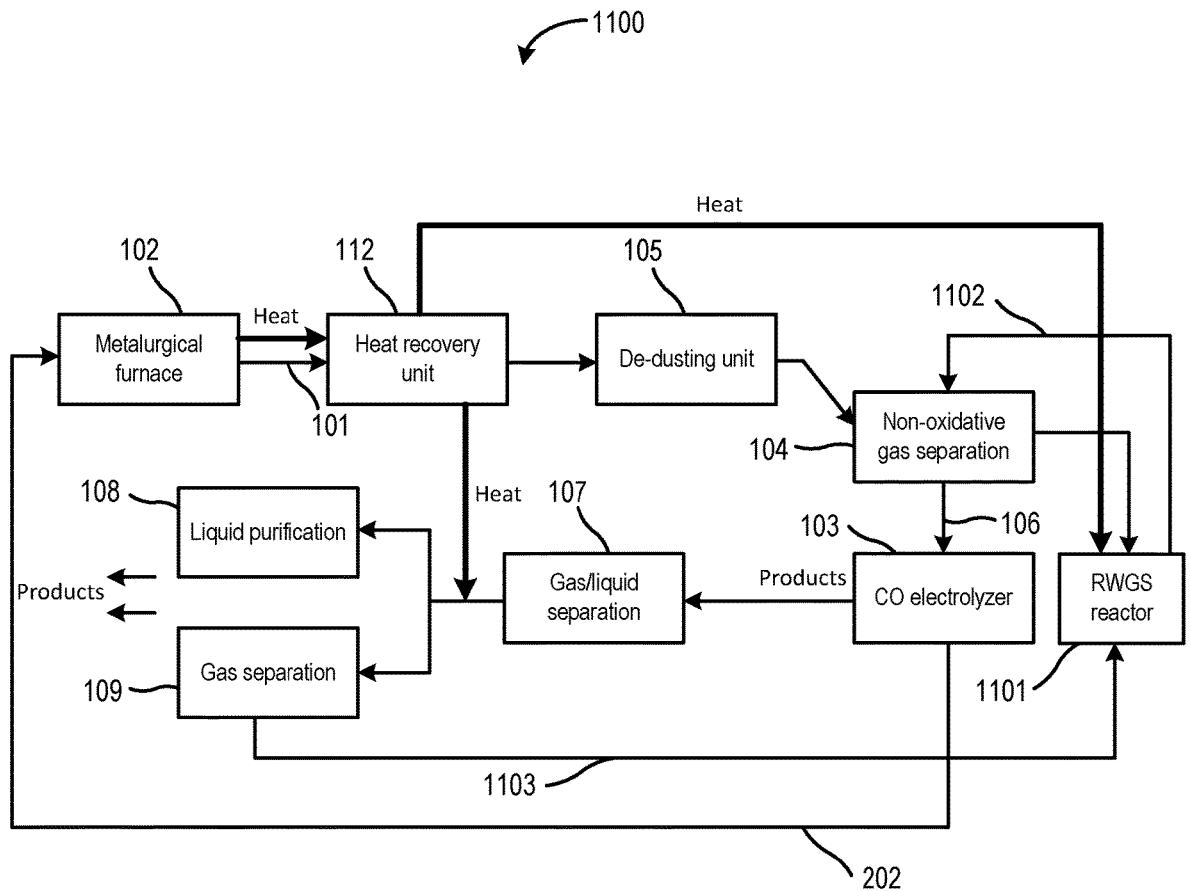
FIG. 11 illustrates a system for valorizing a volume of CO of an off-gas stream from a metallurgical furnace using a CO electrolyzer where a reverse water gas shift (RWGS) reactor valorizes $CO_2$ from the off-gas and the CO from the RWGS reactor is also supplied to the CO electrolyzer in accordance with specific embodiments of the inventions disclosed herein.

In specific embodiments, the CO-depleted off-gas stream obtained after the separation from the CO-rich stream to be fed into the CO electrolyzer is further purified to obtain a $CO_2$ stream. Such $CO_2$ streams can be fed into a RWGS reactor that takes both hydrogen and such purified $CO_2$ stream to produce a stream containing CO, unreacted $CO_2$ and dihydrogen and some methane. The CO obtained from the RWGS reactor can then be further purified and fed into the CO electrolyzer in addition to the CO-rich stream obtained directly from the off-gas purification. The tandem reactor architectures disclosed herein can be designed to operate continuously with CO being produced by the RWGS reactor in time to supply the CO electrolyzer with a sufficient supply of CO (e.g., when the metal producing furnace is not producing an off-gas because it is not operating in a phase that does so). The control system for the tandem reactor could include safeguards to shut down the reactor, or portions thereof, upon detecting the presence or absence of certain chemicals in the reactor. Waste heat from the metal producing furnace can be recovered using a heat recovery unit to supply the heat required to operate the RWGS process. FIG. 11 provides an illustration of system 1100 exhibiting several of these features. System 1100 is similar to system 200 with similar elements being labeled using the same reference numbers. System 1100 differs in that it includes a RWGS reactor 1101 that takes a purified $CO_2$ stream as an input along with waste heat from heat recovery unit 112 and produces a second CO-rich stream 1102 which is fed to non-oxidative gas separation unit 104. This CO-rich stream 1102 will then pass through non-oxidative gas separation unit 104 to be provided to CO electrolyzer 103.

In specific embodiments, the CO electrolyzer evolves dihydrogen at the cathode as a parasitic reaction that competes with the targeted reduction of CO to the valuable carbon-based chemicals. In that case, the evolved dihydrogen can be separated from the stream of valuable chemicals to be either valorized as is or fed back to the RWGS reactor to minimize the requirements in hydrogen for the conversion of the metal producing furnace off-gas derived or captured $CO_2$. Dihydrogen produced from the metal producing furnace itself can also be purified and separated for provision into the RWGS reactor. System 1100 in FIG. 11 illustrates the first of these approaches in that a stream of dihydrogen 1103 from gas separation unit 109 is fed back to RWGS reactor 1101 where it serves as one of the two inputs to the reactor along with a volume of $CO_2$.

In specific embodiments of the inventions disclosed herein, one or more separators can be located on the fluid connections between the reactor components. The separators can be designed to separate out specific chemicals from a fluid stream in the fluid connection. For example, a volume of CO can be separated from a volume of $CO_2$ at the output of the metal producing furnace off-gas uptakes or at an output of a RWGS reactor using at least one separator unit. At least one separator in this example can be an acid scrubber and the electrolyzer can be an alkaline reactor. For example, the CO electrolyzer can be integrated with an upstream acid-scrubbing unit utilizing an amine-based solution such as but not limited to 30% ethanolamine. The separation unit might be a capture solution containing 30% ethanolamine or any other cheaper capturing solution—or even more dilute capturing solution if the concentration of $CO_2$ in the CO+$CO_2$ mix is lower than 20%. In the case of the separator from the metal producing furnace off-gas, unreacted oxygen is removed through a specific separation to minimize the amount of oxygen fed to the CO electrolyzer as the reduction of oxygen is favored compared to CO reduction and leads to wasteful consumption of energy for the unwanted conversion of oxygen into water.

In specific embodiments of the invention, CO can be separated from trace chemicals left over in the output of the metal producing furnace off-gas uptake or of the RWGS reactor. The CO can be separated using various approaches such as separating with membranes, cryogenic separating, separating methods based on variant physical or chemical properties of the components of the output of the RWGS reactor or the metal producing furnace off-gas, separation based on pressure-swing adsorption, temperature-swing adsorption, vacuum- or vacuum-pressure swing adsorption, or separation based on absorption.

In the case where a RWGS is present, a separating system can, for example, be used on the output of the RWGS reactor to first cool the output to remove impurities and then heat the output fluid to allow purified dihydrogen to evaporate through a membrane that filters out CO. Any $CO_2$ or dihydrogen filtered out of the output of the RWGS reactor can be fed back to serve as a feedstock to the RWGS reactor. Any CO filtered out of the output of the electrolyzer can be fed back to serve as a feedstock to the RWGS reactor. Dihydrogen filtered out of the output of the electrolyzer can be fed back to serve as a feedstock to the RWGS reactor.

The CO concentrated exhaust gas from a metal producing furnace can reach a relatively high temperature (500-1500° C.), contains particulate matter (PM) as fly ashes, carbon particles and dust, contains gas contaminants (such as SOx or NOx) and other gas components (such as hydrogen, water, nitrogen, oxygen and $CO_2$).

Several process units can be set on the off-gas stream to make the gas compatible with the specification of a CO electrolyzer. First the gas may be cooled and made free of PM (5 mg/Nm$^3$). For that purpose, a cyclone unit can be installed directly on the hot stream. Gas can enter the cyclone through a tangential inlet at a high velocity (10-30 m/s) and swirl in the cylindrical section of the vessel at the top followed by the conical section at the bottom. Then, a spiral vortex can be created making the heavier solid particle fall and the gas stream flow up. Cyclones can be designed for a cut diameter (d50, d90), meaning that respectively 50% or 90% of the particles with a higher diameter are removed. This cut diameter is usually comprised between 10 and 50 μm, meaning that the unit does not remove all the particulate matter. Downstream units can be used to achieve less than 5 mg/Nm$^3$.

Different options are available to cool the gas. Shell and tube heat exchangers using thermal oil or hot water as coolant can be used. This kind of heat exchanger can be divided into different radiative and convective sections using different coolants or not. The temperature gradient between hot gas and coolant must be controlled. A particle recovery section, comprising an endless screw, can be set between the radiative and the convective sections. The outlet temperature of the gas can be around 250° C.-300° C. remaining above the water dew point temperature and avoiding condensation.

Downstream of the cooling unit, a bag filter can be installed to remove remaining particles. PTFE sleeves can be installed for that purpose. Their maximum operating condition is around 250° C., which corresponds to their degradation temperature. The particles contained in the gas stream will stop and accumulate on the sleeves creating a filter cake. Once the pressure drop through this filter is too high, pressurized air or inert gas is introduced at counter current to make the cake fall. The solid is then removed from the vessel during operation. A coating material, introduced upstream of the bag filter in the form of powder, can be used to capture/remove a part of the gas impurities especially sulfur species, HCl, HCN, and phosphine through the filtration cake layer. The coating material can be, but is not limited to, activated carbon, calcium hydroxide, zinc oxide, or lime. Ceramic or metallic cartridges can be used for the same purpose as alternatives to PTFE sleeves. The main advantage is that they can be operated at a higher temperature but with the expense of a higher cost.

A water quench unit (e.g., jet venturi scrubber) can also be set downstream, upstream or be used instead of the bag filtration unit. In a water quench unit, liquid water is mixed with hot gas. Heat is consumed by the vaporization of the injected water, and the heat is exchanged with cold water which lowers the gas temperature. Such unit allows cooling the gas to a lower temperature (<80° C.) while removing the water condensate and particulate matter (PM) and also a part of the gas species which are soluble in water (e.g., HCl, HCN).

Gas fans or gas blowers can be installed upstream, downstream or in the middle of the filtering and cooling units in order to ensure gas flow. All the units set downstream of the metal producing furnace and the upstream gas fan can be operated under atmospheric pressure and all the unit downstream of the gas fan can be operated above atmospheric pressure. Operating units under atmospheric pressure limit the risk of CO leaks in the process environment. However, air (oxygen) can be accidentally introduced in the process pipe creating an explosive mix. Operating under atmospheric pressure or above can be done according to the risk evaluation and the cost difference between a simple gas fan and a gas fan that is capable of operating at elevated temperatures in the presence of dust.

Downstream of the filtration and cooling units, a CO concentrated stream can still contain gas impurities such as, but not limited to, sulfur compounds ($SO_x$), light hydrocarbons (e.g., Benzene), phosphine ($PH_3$), nitrogen oxides ($NO_x$) or $CO_2$ and other main components such as hydrogen.

A fixed bed filled with dedicated sorbent can be set to remove impurities, especially sulfur compounds such as $SO_x$, COS and $H_2S$ and phosphine. Most commonly, activated carbon impregnated with specific species such as, but not limited to, potassium iodide, potassium permanganate, and metal oxides (such as but not limited to CuO, FeO, MgO) are used to treat the sulfur compounds. The impregnation of these specific species promotes sulfur oxidation into elemental sulfur, which accumulates on the sorbent surface. Adsorption capacities can be as high as 80-100 w/w %. Once the filter is saturated, the sorbent must be replaced. Phosphine can also be removed by being impregnated with activated carbon, HCl, $KNO_3$, Cu species or hexanediol for example. This chemical species allows for the catalytic oxidation of $PH_3$ except for the copper which reacts with phosphine to form $Cu_3P_2$. Molecular sieves (zeolite) or alumina impregnated with different species (e.g., $CaCl_2$)) can also adsorb $PH_3$. This sorbent must be selective through $PH_3$ over CO to be used. Oxygen presence in the exhaust gas even in small quantity (<1% v) will significantly increase the adsorption capacity for sulfur products and phosphine. Non-impregnated activated carbons can be used to remove oxygenated volatile organic compounds (OVCs) and also inorganic compounds. Their adsorption capacity is quite low compared to impregnated activated carbon, but they can be regenerated by flowing the vessel at counter current with steam or warm inert gas. Heat recovered in the heat exchangers on the exhaust gas can be valorized for that purpose. Other processes such as chemical absorption can also be implemented to remove sulfur compounds.

After the removal of inorganic impurities and OVCs, the CO concentrated stream can contain hydrogen (2-40% v dry basis), $CO_2$ (0-5% v dry basis) and nitrogen (1-30% v dry basis). The stream also contains water according to the temperature and the pressure of the stream.

$CO_2$ is an issue for the CO electrolyzer operation and must be removed prior to that unit. The reaction of $CO_2$ with the anolyte (e.g., $OH^-$) produces carbonate and bicarbonate species which lead to the formation of salt precipitates or regions of high salt concentration that foul electrolyzer components and lead to substantially degraded performance. For the cathode section, these precipitates are generally hygroscopic and impede efficient gas and liquid transport across the cathode. Salts formed from the reaction of alkaline media with $CO_2$ can also precipitate within the membrane pores and impede efficient ion transport.

Commercially available $CO_2$ removal units can be based on cryogenic processes, membrane separation modules, swing adsorption processes or absorption processes.

Hydrogen and nitrogen are inert gases when fed into CO electrolyzers. Their presence only impacts the partial pressure of CO at the cathode side. Accordingly, these compounds can be removed from the upstream or downstream of the CO electrolyzer according to their inlet concentration and the nature and the purity of produced species. Other amounts of dihydrogen may be produced in the CO electrolyzer. In such cases, it can be more efficient to separate the total amount of dihydrogen coming from the metal producing/processing furnace downstream of the electrolyzer.

The separating steps and processes described above can take on various forms. The separation system may conduct one or more of multiple separation/purification steps including any technology available for the targeted purification/separation. The separation system can include separation units based on but not limited to membrane technologies including but not limited to dense polymeric membranes, ultrafiltration and nano-filtration membranes, facilitatedtransport membranes, metallic membranes, zeolite membranes, ceramic proton conducting membranes hollow fiber pervaporation membranes, carbon molecular sieve (CMS) membranes, cryogenic technologies, adsorption technologies including but not limited to physisorption and chemisorption based technologies, absorption technologies, including physical absorption technologies and chemical absorption technologies, with operation techniques such as but not limited to vacuum pressure swing, temperature swing, pressure swing, coupled pressure and temperature swing, and electric swing. Chemical adsorbents that can be used include but are not limited to amine-based adsorbents (amine grafted or impregnated solids), metal oxides, metal salts, double salts and hydrotalcites. Physical adsorbents that can be used include but are not limited to materials such as carbon-based materials such as activated carbon or carbon molecular sieve, mesoporous silica, activated alumina, zeolites, zeolitic imidazolate frameworks (ZIFs), metalorganic frameworks (MOFs), covalent organic frameworks (COFs) blended adsorbents.

The removal of $CO_2$ from a gas mixture using the techniques detailed above will need to bring $CO_2$ concentrations below a certain desired threshold, depending on process conditions. This acid gas removal process may require a combination of techniques, or multiple stages of separator units to scrub acid gases more thoroughly from the gas mixture. For example, to reduce the $CO_2$ concentrations down to less than 1% in a CO-rich gas stream leaving a CO producing process, one or more pressure swing adsorption subunits, absorption subunits, or membrane separation subunits may be combined in series or parallel to ensure a high degree of acid gas removal, depending on process conditions required.

Chemical absorption technologies for the removal of acid gas (e.g., $CO_2$) can include those that use methods relying on reversible complexation with a soluble metal complex, or alkaline and/or amine-bearing solutions that use the chemical action of base equivalents to capture acid gases. Chemical and physical absorption process units separating $CO_2$ from a gas stream can be composed by two main portions of equipment: (1) the absorption tower and (2) the regeneration tower. In the absorption tower, the inlet gas is fed at the bottom while the liquid is fed at the top at counter current. The column internals include, but are not limited to, structured packing, random packing, trays, gas and liquid distributors, and liquid sprayers which mainly aim to maximize the exchange area between the liquid and the gas phases. Absorption columns can be operated at 10-80° C. and at 1-80 bars according to the type of solvent. The loaded solvent exits the absorption tower by the bottom and is then pumped and pre-heated before entering the regeneration tower. A regeneration tower can be a stripping column or distillation column which includes a reboiler and a condenser. The absorbed $CO_2$ can be released at the column top by the effect of the temperature increase and/or the pressure decrease. The regeneration tower can be operated at 80-150° C. and 1-10 bars. Lean solvent can be pumped and cooled before entering the absorption column and completing the loop. Chemical based solvents can be, but are not limited to, one or more of methylethanolamine (MEA), dimethylethanolamine (DEA), methyl diethanol amine (MDEA), piperazine (PZ), soda (NaOH), KOH, and a solvent blend. Physical solvents can be, but are not limited to, one or more of dimethyl ether (DME), methanol, and a solvent blend.

Swing adsorption techniques are used to physically or chemically adsorb species in a fluid line in order to separate it from other gases. Swing adsorption is generally non-oxidative to the CO and dihydrogen present in the gas stream. Such techniques use an adsorbent selective for one or more of the molecules in a fluid line and achieve separation through the following steps: the first is the adsorption of the one species, while all other species pass through the adsorbent, and the second is a regeneration, wherein an increase in temperature or/and a decrease in pressure is used to extract the adsorbed species from the adsorbent material. Several swing adsorption separators, usually between two and ten, may be operated in parallel, allowing continuous separation and minimizing the specific power consumption. The adsorbent material can operate via a chemical or physical mechanism. Chemical adsorbents that can be used include, but are not limited to, amine-based adsorbents (amine grafted or impregnated solids), metal oxides, metal salts, double salts and hydrotalcites. Physical adsorbents that can be used include but are not limited to materials such as activated carbons, carbon molecular sieves, mesoporous silica, zeolites, zeolitic imidazolate frameworks (ZIFs), metal organic frameworks (MOFs), or blended adsorbents. Swing adsorption processes can be applied to, but not limited to, $CO_2$ removal, oxygen removal, carbon oxide/dihydrogen separation, nitrogen removal, volatile organic chemical removal, methane/carbon oxide separation, gas drying and a mix of the previous applications according to the sorbent material nature, number of different sorbent layers and the operating conditions.

Membrane separation uses an extended surface comprising a polymeric species for the movement/restriction of a particular species in a fluid line. Membrane separation is generally non-oxidative to the CO and dihydrogen present in the gas stream. The separator may comprise several layers of the membrane surface to achieve effective separation. At commercial scale, membranes can be arranged, in a hollow fiber module, in a spiral wound module, and other modules. The separation is achieved through a favorable chemical interaction of the membrane with the substance to be removed from the fluid line or through a size of pore tailored for the exclusion of larger molecules within the fluid. The different gas species either end on the permeate side, meaning they have gone through the membrane layers leading to pressure drops, or in the retentate side. The separation driving force can be the pressure gradient or/and the concentration gradient between the permeate and the retentate side. These processes may require several independent stages of compressor and membrane units to achieve full purification of the fluid line and to reach the largest recovery rate of the desired species. Membranes can be applied to $CO_2$ removal, oxygen removal, nitrogen removal, dihydrogen/CO separation, olefin removal, gas drying and a mix of the previous application according to the membrane material, the number of membrane stages and the operating conditions.

The separation unit used to separate the CO contained in the metal producing furnace off-gas can be, but is not limited to, an absorption unit using liquid solvent (e.g., CO-SORB process reactor) or a PSA (e.g., CO-PSA) using specific sorbent material. The separating stream containing $CO_2$, oxygen, nitrogen, dihydrogen, methane and other gases present in the metal producing furnace off-gas can be vented and/or valorized for their calorific content. The purified CO is then sent to an electrolyzer to produce any valuable product, among others, ethylene, ethanol or acetic acid/acetate.

The CO gas mixture to be purified and fed into to the CO electrolyzer, depending on the production process, can be water saturated at the stream pressure and temperature or relative humidity can be as high as 80%-100% at the considered pressure and temperature. To avoid water condensation in pipes, gas compressors, and process units, water can be fully or partially removed until a defined temperature dew point. Pipes and process units can be insulated, or heat traced (electrically or through sealed envelope). Several processes can be used to remove water such as but not limited to: (1) a heat exchanger using a cool refrigerant to condense water; (2) a physical absorption unit using physical solvents such as, but not limited to, methanol, glycol (e.g., monoethylene glycol (MEG), diethylene glycol (DEG), triethylene glycol (TEG), or tetraethylene glycol (TREG)); (3) a membrane based processes which is selective for water removal; and (4) an adsorption filter using sorbent such as, but not limited to, activated alumina, zeolite (3A, 4A), and silica gel. Solution (1) cannot reduce the gas water dew point below 0-5° C. Solution (2), (3) and (4) can reduce the gas water dew point between −10° C. and −50° C. meaning less than 10 ppm of water.

CO-rich gas can be compressed, upstream or downstream the separation units, prior to introduction into the electrolyzer. Compressor technologies that can be used include centrifugal or volumetric technologies. Volumetric technologies include, but are not limited to, membrane compressors, screw compressors, and reciprocating compressors. The technology choice depends on the gas flowrate and on the required outlet pressure. Knowing that the maximum compression ratio through a compressor is commonly taken at 3, between 1 and 5 compression stages may be needed to reach the required pressure. Inter-stage cooling steps may then be necessary.

While some systems include two separation systems and a single electrolyzer, many different variations are possible. For example, a single, or multiple separating systems can be connected in series to separate out chemicals such as $CO_2$ from reaching the input of the electrolyzer. The separating can be conducted to ever increasing levels of purity and one or more of the multiple separating systems can be coupled to a single electrolyzer for the delivery of CO. As another example, such separating systems can be coupled with a set of electrolyzers that are configured to accept cathodic inputs with different levels of CO volume or concentration.

In specific embodiments, the DRI furnace can use DRI iron to produce steel. The DRI furnace can be fueled with different reductant sources and in particular gases such as methane or dihydrogen. The dihydrogen can be recovered from the off-gas of the metal producing furnace or from the operation of the electrolyzers disclosed herein. When methane is used as the reductant source for the DRI furnace, great amounts of CO are released in the exhaust gases which can be valorized through a CO electrolyzer towards high-valuable chemicals. The DRI off-gas can also contain some dihydrogen that can be used as an oxidation substrate for any electrochemical process in the overall system as described herein. The dihydrogen can also be used as a feedstock of a RWGS process, in addition to $CO_2$ to produce CO fed into the electrolyzer. In specific embodiments, the DRI off-gas also contains $CO_2$ in addition to the dihydrogen and at least part of each is provided to the RWGS reactor for the production of CO which is then fed into the CO electrolyzer. The CO can also be sourced from a BOF or a BF from the more traditional route to make steel.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the example of a metal producing/processing furnace was used in this disclosure other furnaces can be used in place of or along with the metal producing/processing furnace in the embodiments disclosed herein. The furnaces can be one or more furnaces selected from a group consisting of: a direct reduced iron furnace, a blast furnace, a basic oxygen furnace, and an electric arc furnace. The disclosure of volumes of chemicals in this disclosure is not meant to refer to a physically isolated volume as it is possible for a volume of dihydrogen to exist with a volume of $CO_2$ in a single physical volume in the form of a volume of syngas. Although examples in the disclosure were generally applied to industrial chemical processes, similar approaches are applicable to chemical processing of any scale and scope. These and other modifications and variations to the present invention may be practiced by those skilled in the art, without departing from the scope of the present invention, which is more particularly set forth in the appended claims.

What is claimed is:

1. A system comprising:
a metallurgical furnace;
an off-gas port of the metallurgical furnace for an off-gas including a volume of carbon monoxide;
a carbon monoxide electrolyzer having an anode area and a cathode area;
an acid scrubber coupled between the off-gas port and the carbon monoxide electrolyzer and configured to separate the volume of carbon monoxide from the off-gas and provide the volume of carbon monoxide, after it has been separated, to the carbon monoxide electrolyzer; and
at least one fluid connection;
wherein the at least one fluid connection provides a fluid path for the volume of carbon monoxide from the off-gas port through the acid scrubber and to the cathode area.

2. The system of claim 1, wherein:
the carbon monoxide electrolyzer is configured to generate, using the volume of carbon monoxide and an oxidation substrate, a volume of generated chemicals; and
the volume of generated chemicals is at least one of: a volume of hydrocarbons, a volume of organic acids, a volume of alcohol, a volume of olefins and a volume of N-rich organic compounds.

3. The system of claim 2, wherein:
the volume of generated chemicals is at least 20% by volume of chemicals with two or three carbon atoms.

4. The system of claim 1,
wherein the acid scrubber produces a carbon monoxide rich stream which includes the volume of carbon monoxide that is provided to the carbon monoxide electrolyzer, and the carbon monoxide rich stream is less than 5% carbon dioxide by volume.

5. The system of claim 1, wherein:
the off-gas port is configured to supply the off-gas from a combustion of a feedstock in the metallurgical furnace; and
the metallurgical furnace is one of a basic oxygen furnace, an electric arc furnace, and a blast furnace.

6. The system of claim 1, wherein:
the off-gas port is configured to output a purge gas from the metallurgical furnace; and
the metallurgical furnace is a basic oxygen furnace.

7. The system of claim 1, wherein:
the off-gas port is configured to supply the off-gas from a combustion of a feedstock in the metallurgical furnace;
the feedstock is one of methane and natural gas; and
the metallurgical furnace is a direct reduced iron furnace.

8. The system of claim 1, further comprising:
an oxygen port in the metallurgical furnace; and
a second fluid connection from the carbon monoxide electrolyzer to the oxygen port;
wherein: (i) the carbon monoxide electrolyzer is configured to generate a volume of oxygen; and (ii) the metallurgical furnace is configured to form a slag on a molten bath using the volume of oxygen.

9. The system of claim 1, further comprising:
an oxygen port in the metallurgical furnace; and
a second fluid connection from the carbon monoxide electrolyzer to the oxygen port;
wherein: (i) the metallurgical furnace is one of an electric arc furnace and a basic oxygen furnace; (ii) the carbon monoxide electrolyzer is configured to generate a volume of oxygen; and (iii) the metallurgical furnace is configured to use the volume of oxygen as a feedstock for converting iron to steel in the metallurgical furnace.

10. The system of claim 1, further comprising:
an oxy-fuel burner having an oxygen port; and
a second fluid connection from the carbon monoxide electrolyzer to the oxygen port;
wherein: (i) the carbon monoxide electrolyzer is configured to generate a volume of oxygen; and (ii) the oxy-fuel burner is configured to heat the metallurgical furnace using the volume of oxygen.

11. The system of claim 1, further comprising:
a hydrogen port in the metallurgical furnace; and
a second fluid connection from the carbon monoxide electrolyzer to the hydrogen port;
wherein: (i) the carbon monoxide electrolyzer is configured to generate a volume of hydrogen; and (ii) the metallurgical furnace is configured to use the volume of hydrogen as a reducing gas.

* * * * *